United States Patent
Zamora Esquivel et al.

(10) Patent No.: US 12,039,756 B2
(45) Date of Patent: Jul. 16, 2024

(54) METHODS AND APPARATUS TO CALIBRATE A MULTIPLE CAMERA SYSTEM BASED ON A HUMAN POSE

(71) Applicant: Intel Corporation, Santa Clara, CA (US)

(72) Inventors: Julio Cesar Zamora Esquivel, Zapopan (MX); David Israel Gonzalez Aguirre, Hillsboro, CA (US)

(73) Assignee: INTEL CORPORATION, Santa Clara, CA (US)

( * ) Notice: Subject to any disclaimer, the term of this patent is extended or adjusted under 35 U.S.C. 154(b) by 675 days.

(21) Appl. No.: 17/132,950

(22) Filed: Dec. 23, 2020

(65) Prior Publication Data

US 2021/0118180 A1    Apr. 22, 2021

(51) Int. Cl.
| | |
|---|---|
| *H04N 5/04* | (2006.01) |
| *G06T 7/73* | (2017.01) |
| *G06T 7/80* | (2017.01) |
| *H04N 23/90* | (2023.01) |

(52) U.S. Cl.
CPC .............. *G06T 7/80* (2017.01); *G06T 7/74* (2017.01); *H04N 5/04* (2013.01); *H04N 23/90* (2023.01); *G06T 2207/30196* (2013.01); *G06T 2207/30244* (2013.01)

(58) Field of Classification Search
CPC ... G06T 7/80; G06T 7/74; G06T 2207/30196; G06T 2207/30244; G06T 7/73; G06T 2207/10004; G06T 2207/20084; H04N 5/04; H04N 23/90; H04N 17/002
See application file for complete search history.

(56) References Cited

U.S. PATENT DOCUMENTS

| | | | |
|---|---|---|---|
| 9,686,539 B1 * | 6/2017 | Zuliani | H04N 13/246 |
| 2004/0062419 A1 * | 4/2004 | Roh | G06V 10/46 |
| | | | 382/104 |
| 2020/0226788 A1 | 7/2020 | Tsunashima et al. | |

(Continued)

OTHER PUBLICATIONS

Hödlmoser et al. "Multiple Camera Self-calibration and 3D Reconstruction Using Pedestrians." Advances in Biometrics: International Conference, Aug. 2007, pp. 1-10, (accessed on Feb. 28, 2023, https://doi.org/10.1007/978-3-642-17274-8_1).

(Continued)

*Primary Examiner* — Michael Lee
(74) *Attorney, Agent, or Firm* — Hanley, Flight & Zimmerman, LLC

(57) ABSTRACT

Methods and apparatus to calibrate a multicamera system based on a human pose are disclosed. An example apparatus includes an object identifier to identify a first set of coordinates defining first locations of anatomical points of a human in a first image captured by a first camera and identify a second set of coordinates defining second locations of the anatomical points in a second image captured by a second camera. The apparatus includes a pose detector to detect, based on at least one of the first or second sets of coordinates, when the human is in a particular pose. The apparatus includes a transformation calculator to, in response to detection of the human in the particular pose, calculate a relative transformation between the first camera and the second camera based on a first subset of the first set of coordinates and a second subset of the second set of coordinates.

25 Claims, 10 Drawing Sheets

(56) References Cited

U.S. PATENT DOCUMENTS

| | | | | |
|---|---|---|---|---|
| 2020/0242805 A1* | 7/2020 | Deng | .................... | G06T 7/292 |
| 2020/0394821 A1* | 12/2020 | Huang | .................. | A61B 5/055 |
| 2021/0056297 A1* | 2/2021 | Shimshoni | ............. | G06T 7/285 |
| 2021/0104069 A1* | 4/2021 | Tahara | .................... | G06T 7/80 |
| 2021/0390738 A1* | 12/2021 | Chandran | ............ | H04N 17/002 |
| 2022/0051419 A1* | 2/2022 | Spiteri | ...................... | G06T 7/70 |
| 2022/0156963 A1* | 5/2022 | Takahashi | .............. | G01B 11/00 |

OTHER PUBLICATIONS

Korner, Clemens, "Object Tracking using Projective Invariants", B.Sc. Thesis, (Jan. 31, 2016), Jan. 31, 2016, 42 pages, (Accessed on Feb. 28, 2023, URL: https://web.archive.org/web/20200919095400/ https://cvl.tuwien.ac.at/staff/roman-pflugfelder).

European Patent Office, European Search Report, issued in connection with European Patent Application No. 21198878, Mar. 24, 2022, 10 pages.

Gao et al., "Complete Solution Classification for the Perspective-Three-Point Problem," Research Gate Publication, available at https://www.researchgate.net/publication/3193582 (retrieved Dec. 11, 2020), Sep. 2003, 15 pages.

Cao et al., "OpenPose: Realtime Multi-Person 2D Pose Estimation using Part Affinity Fields," IEEE Transactions on Pattern Analysis and Machine Intelligence, May 30, 2019, 14 pages.

Wikipedia, "Darboux frame," retrieved from https://en.wikipedia.org/w/indexphptitle=Darboux_frame&oldid=996778794, page last edited on Dec. 28, 2020, 8 pages.

European Patent Office, "Communication pursuant to Rule 71(3) EPC," issued in connection with European patent Application No. 21198878.7, dated Feb. 15, 2024, 46 pages.

* cited by examiner

METHODS AND APPARATUS TO CALIBRATE A MULTIPLE CAMERA SYSTEM BASED ON A HUMAN POSE

FIELD OF THE DISCLOSURE

This disclosure relates generally to multicamera calibration and, more particularly, to methods and apparatus to calibrate a multicamera system based on a human pose.

BACKGROUND

In recent years, digital cameras and multicamera systems have increased in complexity while calibration techniques for calibrating such multicamera systems (by estimating extrinsic parameters of the cameras) have remained a burdensome task. Multicamera systems are useful for many different applications including sports telecasting, security and defense systems, home entertainment systems, virtual and/or augmented reality, IoT appliances, and drones. As multicamera systems become more widely available to the public and nonprofessionals, robust calibration of multicamera systems may become a limiting factor to the accessibility and portability of multicamera applications.

BRIEF DESCRIPTION OF THE DRAWINGS

The figures are not necessarily to scale. In general, the same reference numbers will be used throughout the drawing(s) and accompanying written description to refer to the same or like parts.

Figure 1A:
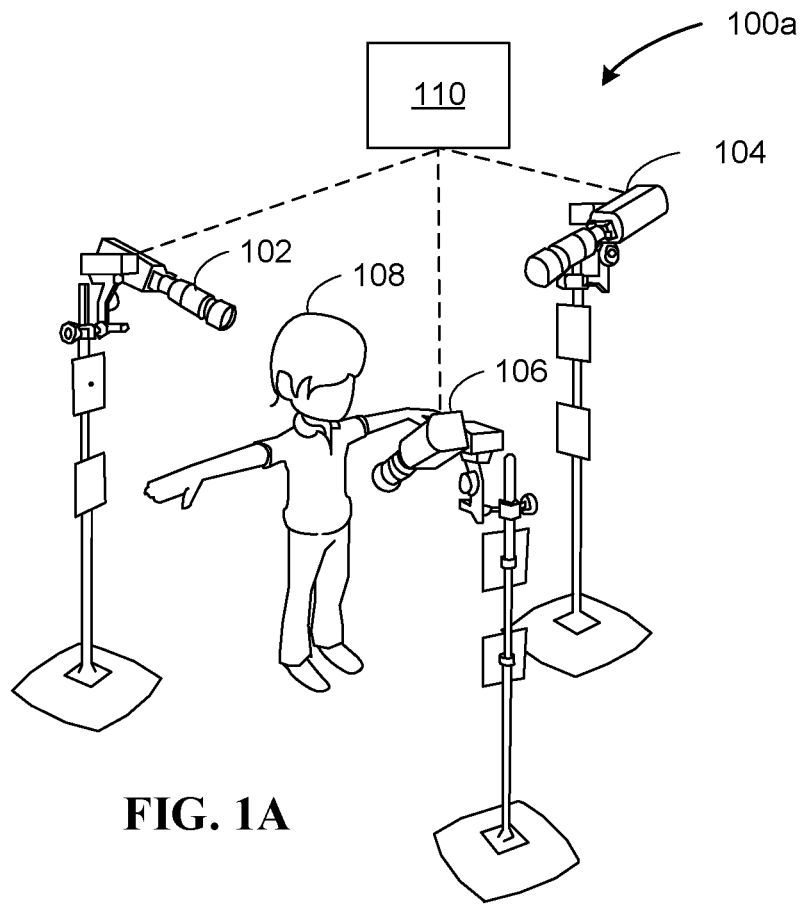
FIGS. 1A and 1B are example diagrams illustrating the example use of a human for calibrating example multicamera systems.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Prior techniques for calibrating multicamera systems include using patterns (e.g., chessboard patterns or other tags), using measurement devices (e.g., rulers, compass, Vernier Calipers, etc.), and/or using fiducial tagging and associated 3D estimation. However, these prior techniques can be burdensome and the tools needed for these techniques may not be readily available. In addition, the state and precision of the calibration apparatus used to calibrate the system may be hard to keep in shape for long running applications when deployed by non-technical personnel. In many cases, while a user may be able to obtain the intrinsic parameters of a camera (e.g., focal length, pixel depth, etc.), online or directly from the framework of the system, the user may not be able to obtain extrinsic parameters (e.g., the three-dimensional (3D) positions and orientations) of the cameras with respect to each other and/or the associated environment to be imaged.

Examples disclosed herein enable the use of humans as calibration patterns for calibration (e.g., determination of extrinsic parameters) of cameras in a multicamera system. Examples disclosed herein eliminate the need for preprinted patterns and/or tags to be acquired and positioned for reference during calibration. Rather, examples disclosed herein enable calibration of multicamera systems (e.g., calibration without the placement of specific preprinted patterns or tags) by using a human within the in environment to be imaged as a reference marker or pattern relied on for calibration. As a result, examples disclosed herein empower users to easily create smart-spaces and interactive games and enable the improved use of depth sensing products (e.g., RealSense™ technology developed by Intel®). Furthermore, examples disclosed herein provide the ability to calibrate (e.g., determine the extrinsic parameters of) cameras at farther distance from a target environment than would be possible using typical calibration patterns due to the size of the human used as the calibration pattern. In addition, examples disclosed herein allow a user to calibrate (e.g., determine the extrinsic parameters of) a multicamera system without knowing the intrinsic parameters of the cameras.

Examples disclosed herein enable the use of humans as calibration patterns by introducing a cross-ratio invariant into the calibration of cameras in a multicamera system. Example methods, apparatus, systems and articles disclosed herein include a multicamera calibration controller to identify anatomical points of a human subject in images captured by multiple cameras and calculate the cross-ratio of image coordinates corresponding to the anatomical points of the human subject. In response to determining that the calculated cross-ratio of image coordinates corresponding to a first camera matches a baseline cross-ratio, examples disclosed herein calculate a transformation of each of the first and second cameras relative to the human subject. Further, in some examples, the transformations of each camera relative to the human subject may be used to calculate a transformation between the first camera and the second camera. This same process may be used to define transformations between all cameras in a multicamera system thereby defining all extrinsic parameters for a fully calibrated system.

Figure 1B:
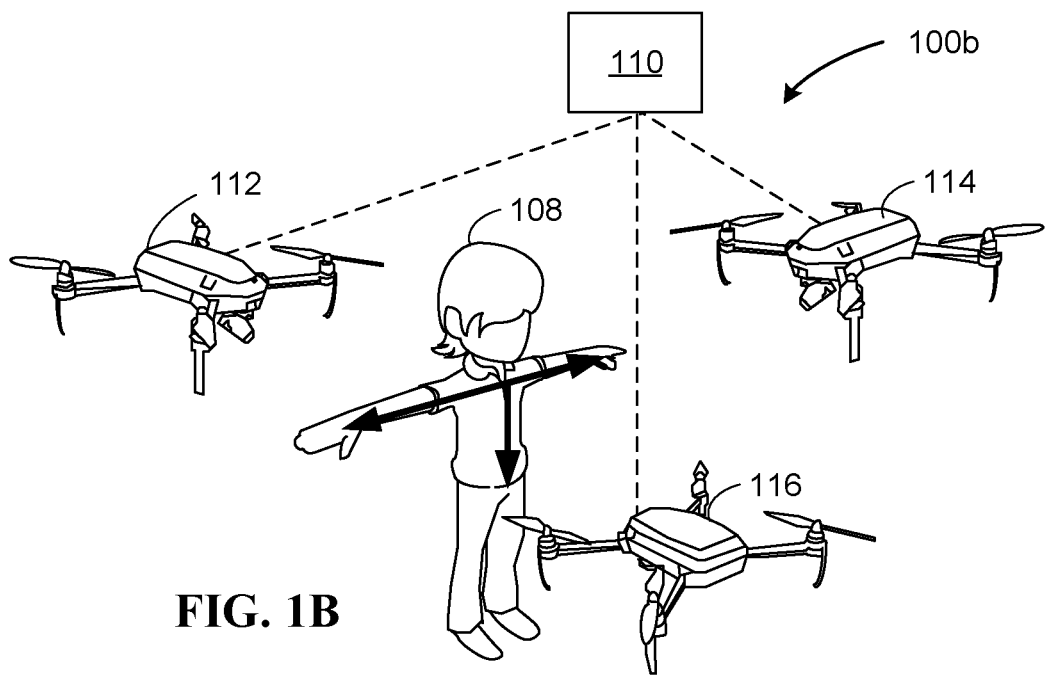

FIGS. 1A and 1B are example diagrams illustrating the example use of a human for calibrating example multicamera systems. The example multicamera system 100a illustrated in FIG. 1A includes an example first stationary camera 102, an example second stationary camera 104, and an example third stationary camera 106. In the midst of the cameras 102, 104, 106, as shown in the illustrated example, a human subject 108 is standing in a T-pose (e.g., arms extending outward to the left and right of the body in a substantially straight line). The example stationary cameras 102, 104, 106 illustrated in FIG. 1A, as their name implies, are stationary cameras arranged to stay fixed in position while capturing image data (e.g., still images and/or video). In the illustrated example, the three stationary cameras 102, 104, 106 surround the human subject 108 and are positioned to face in a direction such that the human subject 108 is within a field of view of each of the cameras. Due to the relative positions of the example stationary cameras 102, 104, 106 and the human subject 108, the example stationary cameras 102, 104, 106 each have a different viewing angle of the human subject 108. More generally, in some examples, the example stationary cameras 102, 104, 106 are each associated with a different translation and rotation with respect to the other stationary cameras 102, 104, 106 and with respect to the human subject 108. In some examples, the example stationary cameras 102, 104, 106 each have six degrees of freedom (e.g., three degrees of translation and three degrees of rotation) with respect to the other stationary cameras 102, 104, 106, the human subject 108, and/or any other reference point defined in three-dimensional space.

As shown in the illustrated example, each of the stationary cameras 102, 104, 106 are in communication with an example multicamera calibration controller 110 that may be implemented to calibrate the multicamera system 100a of FIG. 1A. The example stationary cameras 102, 104, 106 provide captured image data to the example multicamera calibration controller 110 via any suitable wired or wireless connection. In some examples, the stationary cameras 102, 104, 106 provide the image data they capture of the human subject 108 in substantially real time. As used herein "substantially real-time" refers to occurrence in a near instantaneous manner recognizing there may be real world delays for computing time, transmission, etc. Thus, unless otherwise specified, "substantially real time" refers to real time+/−1 second. In other examples, the image data captured by the cameras 102, 104, 106 is stored and provided to the example multicamera calibration controller 110 at a later point in time (e.g., seconds later, minutes later, hours later, etc.) to determine the extrinsic parameters for the example cameras 102, 104, 106.

The example multicamera system 100b illustrated in FIG. 1B includes an example first dynamic camera 112, an example second dynamic camera 114, and an example third dynamic camera 116 surrounding a human subject 108 standing in a T-pose. The example dynamic cameras 112, 114, 116 illustrated in FIG. 1B are integrated into respective drones. As such, the example dynamic cameras 112, 114, 116 illustrated in FIG. 1B are dynamic cameras capable of moving and/or repositioning (relative to one another and/or relative to the human subject 108) while capturing image data. Although the dynamic cameras 112, 114, 116 of the illustrated example move with movement of the drones, the dynamic cameras 112, 114, 116 may move in other ways (e.g., carried by different people, attached to moving camera jibs or cranes, etc.). In the illustrated example, the three stationary cameras 112, 114, 116 surround the human subject 108 and are positioned to face in a direction such that the human subject 108 is within a field of view of each of the cameras. Due to the relative positions of the example dynamic cameras 112, 114, 116 and the human subject 108, the example dynamic cameras 112, 114, 116 each have a different viewing angle of the human subject 108. More generally, in some examples, the example dynamic cameras 112, 114, 116 each have six degrees of freedom (e.g., three degrees of translation and three degrees of rotation) with respect to the other dynamic cameras 112, 114, 116, the human subject 108, and/or any other reference point defined in three-dimensional space.

As shown in the illustrated example, each of the dynamic cameras 112, 114, 116 are in communication with an example multicamera calibration controller 110 that may be implemented to calibrate the multicamera system 100b of FIG. 1B. The example dynamic cameras 112, 114, 116 provide captured image data to the example multicamera calibration controller 110 via any suitable wired or wireless connection. In some examples, the dynamic cameras 112, 114, 116 provide the image data they capture of the human subject 108 in substantially real time. In other examples, the image data may be stored and provided to the controller 110 for analysis at a later point in time.

Figure 2:
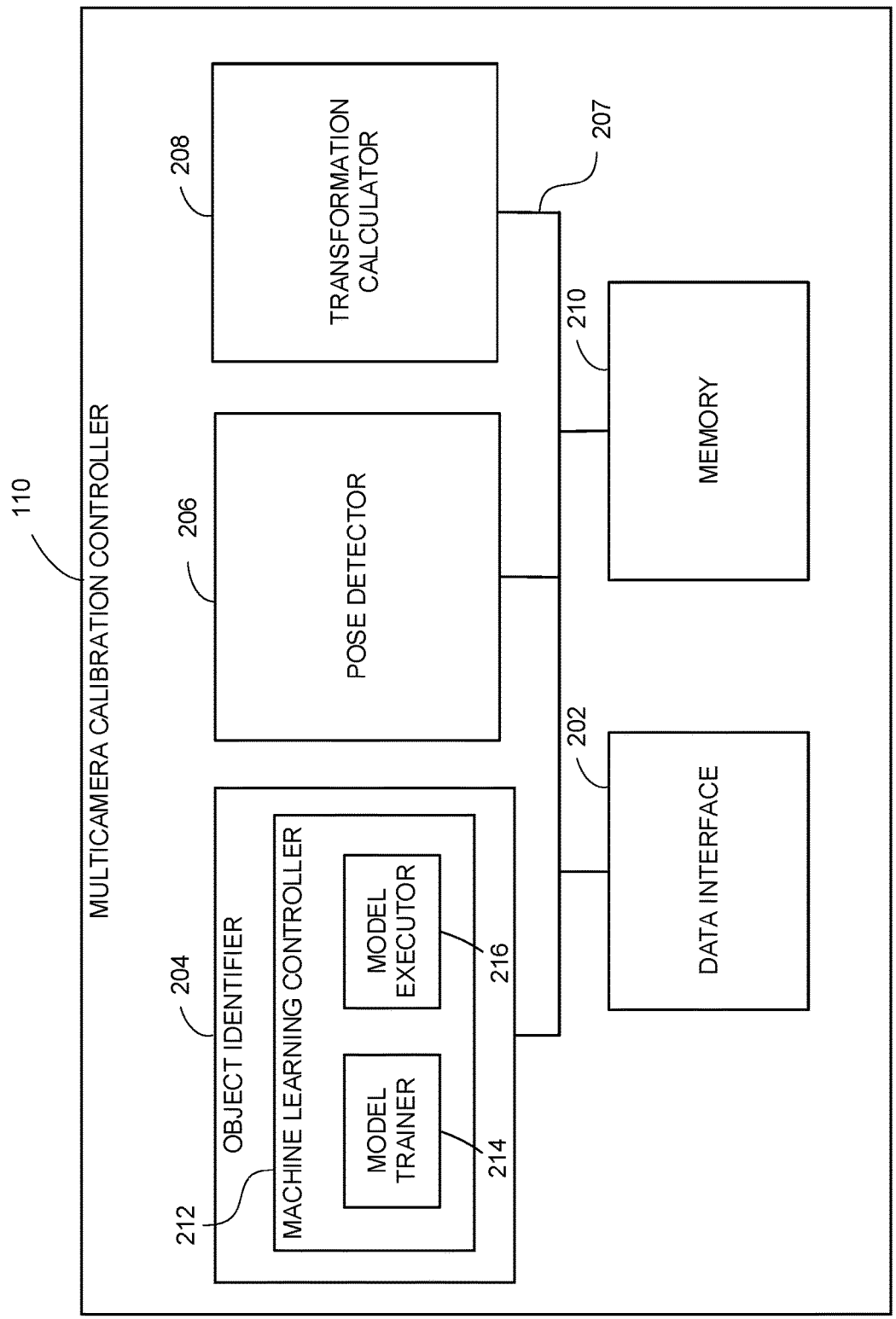
FIG. 2 is an example block diagram of the example multicamera calibration controller of FIGS. 1A and 1B to calibrate a multicamera system.

FIG. 2 is an example block diagram of the example multicamera calibration controller 110 of FIGS. 1A and/or 1B to calibrate multiple cameras (e.g., the cameras 102, 104, 106, 112, 114, 116). The example data interface 202 enables communications with input and/or output devices. For instance, in some examples, the data interface 202 receives image data (e.g., a still image, a video stream, etc.) from one or more of the cameras 102, 104, 106, 112, 114, 116. Further, in some examples, the data interface 202 transmits and/or provides other data to a display and/or other remote device indicative of results of an analysis of the image data (e.g., calculated transformations including translation parameters and/or the rotation parameters of the cameras 102, 104, 106, 112, 114, 116) generated by one or more of an example object identifier 204, an example pose detector 206, an example transformation calculator 208, and/or an example memory 210. The example memory 210 stores information including image data, camera data, machine learning algorithms (e.g., trained machine learning models), libraries, and/or any other suitable data for camera calibration. In some examples, the example data interface 202, the example object identifier 204, the example pose detector 206, the example transformation calculator 208, and/or the example memory 210 are connected via a bus 207.

The example multicamera calibration controller 110 illustrated in FIG. 2 includes the example object identifier 204 to detect a human subject (e.g., the human subject 108 illustrated in FIGS. 1A and 1B) in the image data, estimate and/or identify anatomical points/connections of the human subject represented in the image data (e.g., a point on the body of the human subject, a body part of the human subject, and/or an intersection of body parts of the human subject such as a joint, and/or generate a digital skeleton based on the identified anatomical points and/or connections), and/or generate a digital skeleton (e.g., a point cloud skeleton) based on the estimated anatomical points and/or anatomical connections of the human subject.

Figure 3:
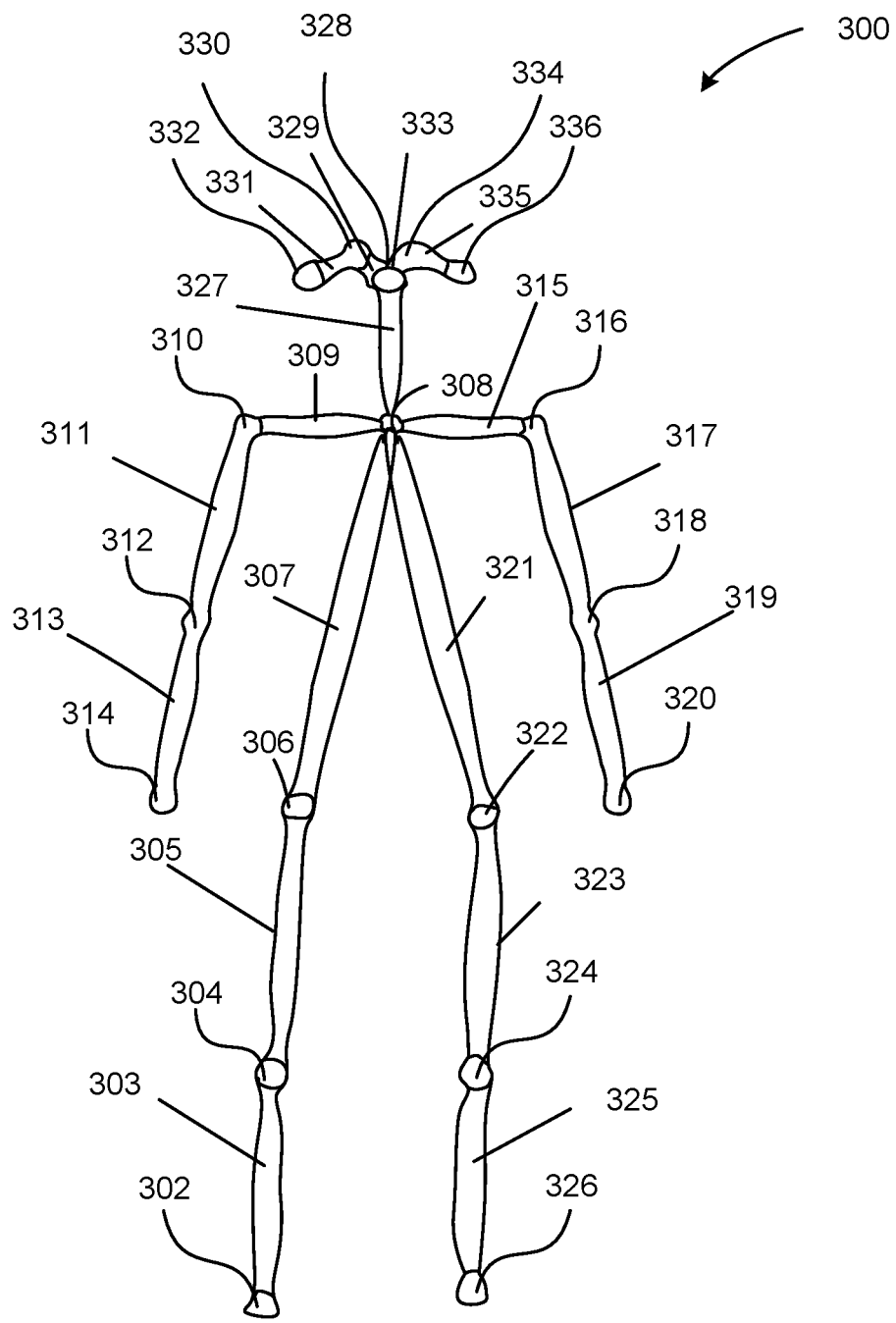
FIG. 3 is an example digital point cloud skeleton generated by the example multicamera calibration controller of FIGS. 1A and/or 1B.

In some examples, the example object identifier 204 of FIG. 2 identifies one or more of the anatomical points and/or anatomical connections illustrated in the example digital point cloud skeleton 300 illustrated in FIG. 3. For example, the example object identifier 204 may identify and/or estimate the location of a first foot 302 of a human subject, a first knee 304 of a human subject, a first hip 306 of a human subject, a first hand 314 of a human subject, a first elbow 312 of a human subject, a first shoulder 310 of a human subject, a neck 308 of a human subject, a second shoulder 316 of a human subject, a second elbow 318 of a human subject, a second hand 320 of a human subject, a second hip 322 of a human subject, a second knee 324 of a human subject, a second foot 326 of a human subject, a nose 328 of a human subject, a first eye 330 of a human subject, a first ear 332 of a human subject, a second eye 334 of a human subject, and/or a second ear 336 of a human subject. In some examples, the example object identifier 204 identifies image coordinates corresponding to the detected anatomical points. In some examples, the image coordinates corresponding to the example anatomical point and/or anatomical connection are two-dimensional (2D) image coordinates (e.g., P(x, y)) or three-dimensional (3D) image coordinates (e.g., P(x, y, z)). In some examples, the image coordinates are image coordinate vectors. In some examples, the image coordinates and/or coordinate vectors of the detected anatomical points are stored in the example memory 210. In some examples, the image coordinates and/or coordinate vectors correspond to one or more pixels in an image of the human subject received from a camera (e.g., the cameras 102, 104, 106, 112, 114, 116 illustrated in FIGS. 1A and 1B).

In some examples, the example object identifier 204 identifies and/or estimates the location of a connection between two anatomical points identified by the example object identifier 204. For example, the example object identifier 204 may identify and/or estimate any one or more of the connections illustrated in example digital point cloud skeleton illustrated in FIG. 3. For example, the example object identifier 204 may identify a connection 303 between a first foot 302 and a first knee 304, a connection 305 between the first knee 304 and a first hip 306, a connection 307 between the first hip 306 and a neck 308, a connection 309 between the neck 308 and a first shoulder 310, a connection 311 between the first shoulder 310 and a first elbow 312, a connection 313 between the first elbow 312 and a first hand 314, a connection 315 between the neck 308 and a second shoulder 316, a connection 317 between the second shoulder 316 and a second elbow 318, a connection 319 between the second elbow 318 and a second hand 320, a connection 321 between the neck 308 and a second hip 322, a connection 323 between the second hip 322 and a second knee 324, a connection 325 between the second knee 324 and a second foot 326, a connection 327 between the neck 308 and a nose 328, a connection 329 between the nose 328 and a first eye 330, a connection 331 between the first eye 330 and a first ear 332, a connection 333 between the nose 328 and a second eye 334, and/or a connection 335 between the second eye 334 and a second ear 336. In some examples, the example object identifier 204 identifies image coordinate vectors corresponding to the detected anatomical connections. In some examples, the image coordinate vectors of the detected anatomical connections are stored in the example memory 210.

While the example digital skeleton 300 illustrated in FIG. 3 includes eighteen anatomical points and seventeen anatomical connections, the example object identifier 204 may identify and/or estimate any suitable number of anatomical points and/or anatomical connections in addition to, in combination with, or instead of those illustrated in FIG. 3. For example, the example object identifier 204 may identify and/or estimate the location of one or more anatomical points disposed between the adjacent anatomical points illustrated in FIG. 3, (e.g., a wrist, a torso, and/or a mouth). In some examples, the example object identifier 204 identifies intermediate points that are not specifically linked to any discrete anatomical point on the human subject but determined with reference to two or more other anatomical points. For instance, a central pelvic point may be determined by identifying an intermediate point located halfway between the two points identifying the first and second hips 306, 322 of the human. As another example, an intermediate point corresponding to a center of the torso of the human subject may be identified where a first line extending from the first shoulder 310 to the second hip 322 crosses a second line extending from the second shoulder 316 to the first hip 306. In some examples, the example object identifier 204 identifies and/or estimates the location of any one or more anatomical point extremities outside of the anatomical points illustrated in FIG. 3 (e.g., a finger or a forehead).

In some examples, the example object identifier 204 identifies and/or estimates the location of any number and/or combination of anatomical points suitable for detecting when the anatomical points are arranged in line (e.g., when the human subject stands in a particular pose such that the anatomical points are aligned). For example, the example object identifier 204 may identify and/or estimate a first hand 314, a first shoulder 310, a second shoulder 316, and a second hand 320, a connection between the first hand 314 and the first shoulder 310, a connection between the first shoulder 310 and the second shoulder 316, and a connection between the second shoulder 316 and the second hand 320 to detect a line when the human subject is in a T-pose, (e.g. hands stretched outward to the left and right of the body as illustrated in FIG. 1B). In some examples, the example object identifier 204 identifies and/or estimates the location of any number and/or combination of anatomical points and/or anatomical connections of the human subject suitable for calculating the cross-ratio of a line formed by the anatomical points when the human subject is in a pose (e.g., the T-pose). In some examples, the example object identifier 204 identifies and/or estimates the location of any number and/or combination of anatomical points and/or anatomical connections of the human subject arranged in a triangle to define three points that may be used to solve a perspective-three-point (P3P) problem. In some examples, at least two of the three points in the triangle defining the P3P problem are identified from among the anatomical points arranged in a straight line mentioned above. In some examples, the example object identifier 204 identifies and/or estimates the location of any number and/or combination of anatomical points and/or anatomical connections of the human subject when in a particular pose (e.g., a T-pose) to define four points that may be used to solve a perspective-four-point (P4P) problem. In some examples, at least three of the four points in the P4P problem are identified along the straight line defined by the four anatomical points used to calculate the cross-ratio as outlined above. In some such examples, the three points along the line correspond to different ones of the four anatomical points detected by the pose detector 206 as being arranged in a straight line. In other examples, at least some of three points may correspond to other points distinct from the four points but nevertheless positioned on the straight line. In some examples, the fourth point in the P4P problem is selected to be located on a line extending substantially perpendicular to the straight line mentioned above and passing through one of the other three points in the P4P problem located along the straight line. As a result, the four points of the P4P problem define a shape having a right angle (e.g., a T-shape, an L-shape) that can be used to define the original of a coordinate system.

Figure 4B:
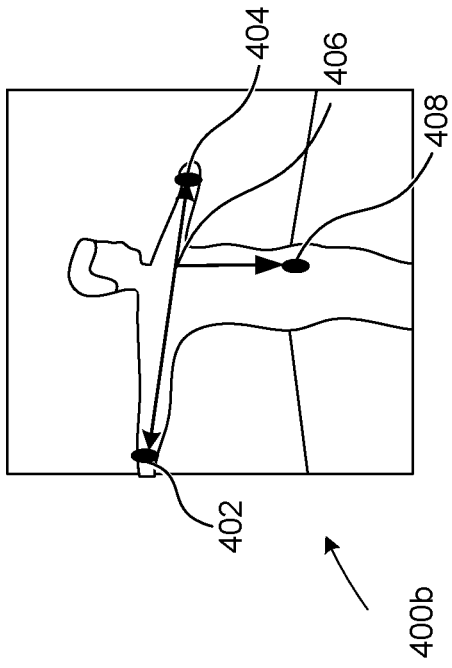
FIGS. 4A-4C are example images from three different viewing angles of a human in a T-pose with example anatomical points and connection overlays.
Figure 4A:
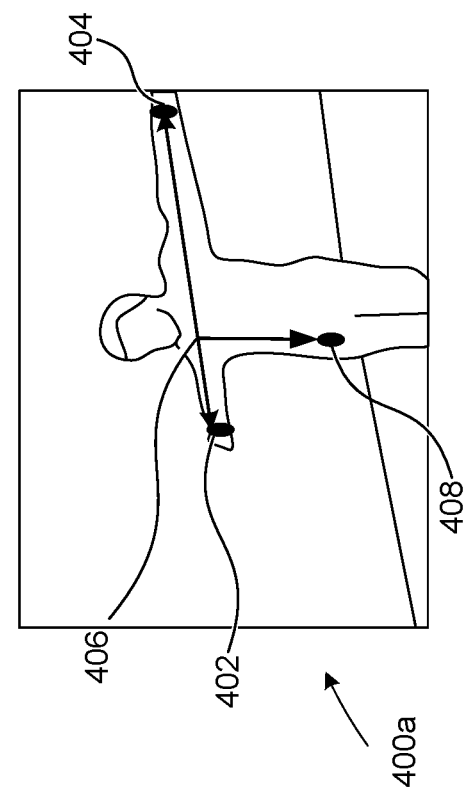
Figure 4C:
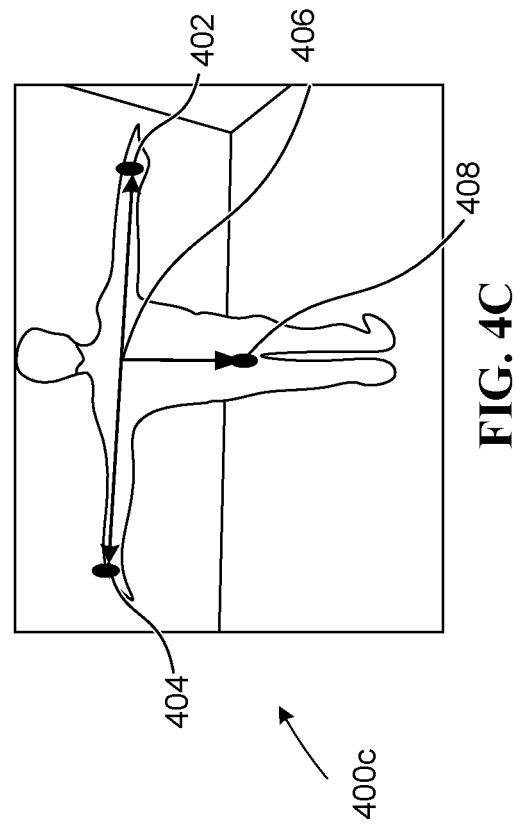

FIGS. 4A-4C are example images from three different images 400a, 400b, 400c associated with three different viewing angles of a human subject 400 in a T-pose in which the shoulders elbows and hands of the human subject are in a straight line. In this example, the anatomical points at the end of this straight line (e.g., a first anatomical point 402 corresponding to the right hand of human subject 400 and a second anatomical point 404 corresponding to the left hand of human subject 400) and a third point 406 corresponding to the chest of the human subject 400 are selected as three of the four points in a T-shape to be defined for a P4P problem. In some examples, the location of the third point 406 is identified by determining the midpoint between the anatomical points in the digital skeleton 300 corresponding to the two shoulders 310, 316 of the human subject. In the illustrated example, a fourth anatomical point 408 corresponding to the pelvis of human subject 400 is defined as the fourth point in the T-shape used as the basis for a P4P problem. In some examples, the location of the fourth point 408 is identified by determining the midpoint between the anatomical points in the digital skeleton 300 corresponding to the two hips 306, 322 of the human subject. As a result, the third point 406 and the fourth point 408 are vertical aligned and define a line that is substantially perpendicular to the straight line defined by the arms of the human subject. Selecting points for the P4P problem that are at right angles in this matter serves to define a reference coordinate system. In other examples, the fourth point 408 may be selected at other locations that is not vertical aligned with any of the other three points 402, 404, 406 as it is still possible to solve the P4P problem. The solution to the P4P problem defines the transformation parameters of the corresponding camera. That is, although the shape of the T-shape defined by the four points 402, 404, 406, 408 appears different in each of the three images 400a, 400b, 400c, the T-shape actually has a fixed shape in the real-world due to the anatomical proportions of the human subject 400. Furthermore, in some examples, the T-shape has a fixed shape in the real-world across all images of the human subject (captured by different cameras) because the cameras are synchronized to capture images at substantially the same time (e.g., simultaneously or within less than 1 second of each other). Thus, the apparent differences in the shape of the T-shape is due to the different perspectives of the cameras that captured each of the three images 400a, 400b, 400c. Although an example T-shape is shown and described, any points in any suitable arrangement that have fixed distances and positions relative to one another (based on human anatomy) when a human subject is determined to be in a particular pose may be used to define a P4P problem that can be solved to define the transformation parameters for a corresponding camera. More generally, so long as at least one of the four points used in the P4P problem is out of alignment with the other three points in the P4P problem (e.g., the points are arranged in a triangle), a solution to the problem can be determined.

The example object identifier 204 of the example multi-camera calibration controller 110 illustrated in FIG. 2 includes an example machine learning controller 212 to implement machine learning models to analyze image data to detect a human subject, identify and/or estimate the location of anatomical points and/or anatomical connections on the human subject, and/or generate a digital skeleton (e.g., the digital point cloud skeleton 300 illustrated in FIG. 3). In the example illustrated in FIG. 2, the example machine learning controller 212 includes an example model trainer 214 to train a model based on input training data (e.g., training images), and an example model executor 216 to execute a model (e.g., a trained model). In some examples, the example model trainer 214 implements a training algorithm to train a model to operate in accordance with patterns and/or associations based on, for example, training data. In some examples, once the training is complete, the model is deployed to the example model executor 216 as an executable construct. In some examples, the example model executor 216 uses the trained machine learning model to process an input (e.g., an image of a human subject) and provide an output indicative of image coordinates and/or coordinate vectors of corresponding anatomical points and/or anatomical connections. In some examples, the training model and/or the execution model, including algorithms associated with the training model and/or execution model, is stored in the example memory 210.

In some examples, the example object identifier 204 of the example multicamera calibration controller 110 illustrated in FIG. 2 implements a machine learning model (e.g., linear regression, logistic regression, deep neural network (DNN), convolutional neural network (CNN), and/or multi-stage CNN) to identify and/or estimate the location of anatomical points and/or anatomical connections on a human subject in an image from a camera. In some examples, the example machine learning controller 212 performs human pose estimation techniques to identify anatomical points and/or connections by generating an inference over a combination of local observations on body parts and the spatial dependencies between them. In some examples, the example machine learning controller 212 implements any suitable 2D and/or 3D pose estimation analysis technique now known or developed in the future to identify anatomical points and/or connections of a human subject.

In some examples, the example machine learning controller 212 of FIG. 2 implements 2D pose estimation by generating confidence maps to detect anatomical points in an image. In some examples, the example machine learning controller 212 selects a maximum of the confidence maps and/or applies non-maximum suppression (NMS) to identify a candidate body part of the detected anatomical points. In some examples, the example machine learning controller 212 generates part affinity fields (PAFs) (e.g., a set of 2D vector fields that encode the location and orientation of body parts over the image domain) to associate detected anatomical points with other anatomical points. In some examples, the example machine learning controller 212 performs a set of bipartite matchings to associate the body part candidates generated based on the confidence maps. In some examples, the example machine learning controller 212 assembles the predictions and/or associations identified by the example machine learning controller 212 to generate a full body pose (e.g., a digital skeleton such as the one illustrated in FIG. 2). In some examples, only a portion of a digital skeleton is generated and/or identified. In some examples, the example machine learning controller 212 outputs image coordinates and/or coordinate vectors of a detected anatomical point and/or anatomical connection identified by the example machine learning controller 212. In some examples, the example machine learning controller 212 outputs the image coordinates and/or image coordinate vectors to the example pose detector 206 for pose detection and/or the example memory 210 for storage.

The example multicamera calibration controller 110 illustrated in FIG. 2 includes the example pose detector 206 to detect when the human subject 108 is standing in a particular pose in which at least four of the anatomical points identified and/or estimated by the example object identifier 204 are arranged in a line (e.g., the four points are all collinear). More particularly, the pose detector 206 detects when the human subject is standing in a particular pose (that includes four anatomical points arranged in a line) by calculating a cross-ratio of the four anatomical points of the human subject in the image. It is a geometric property of four collinear points that the cross-ratio of such points is projective invariant. That is, when four points are in a line and remain at fixed distances relative to each other, the cross-ratio of those points along the line remains at a fixed value for any projection regardless of the location of the point of origin relative to the four points. Inasmuch as the dimensions between different ones of the anatomical points are fixed (e.g., the forearm between the wrist and elbow has a fixed dimension, the upper arm between the elbow and the shoulder has a fixed dimension, the distance between the shoulders is a fixed dimension), when such anatomical points are held in a line (e.g., when a person stands in a T-pose), the anatomical points define a fixed spacing along a straight line and, therefore, are in a projective invariant arrangement. As a result, the cross-ratio of the four anatomical points calculated from any perspective around the human subject should be the same. This is demonstrated graphically in FIG. 5A.

Figure 5A:
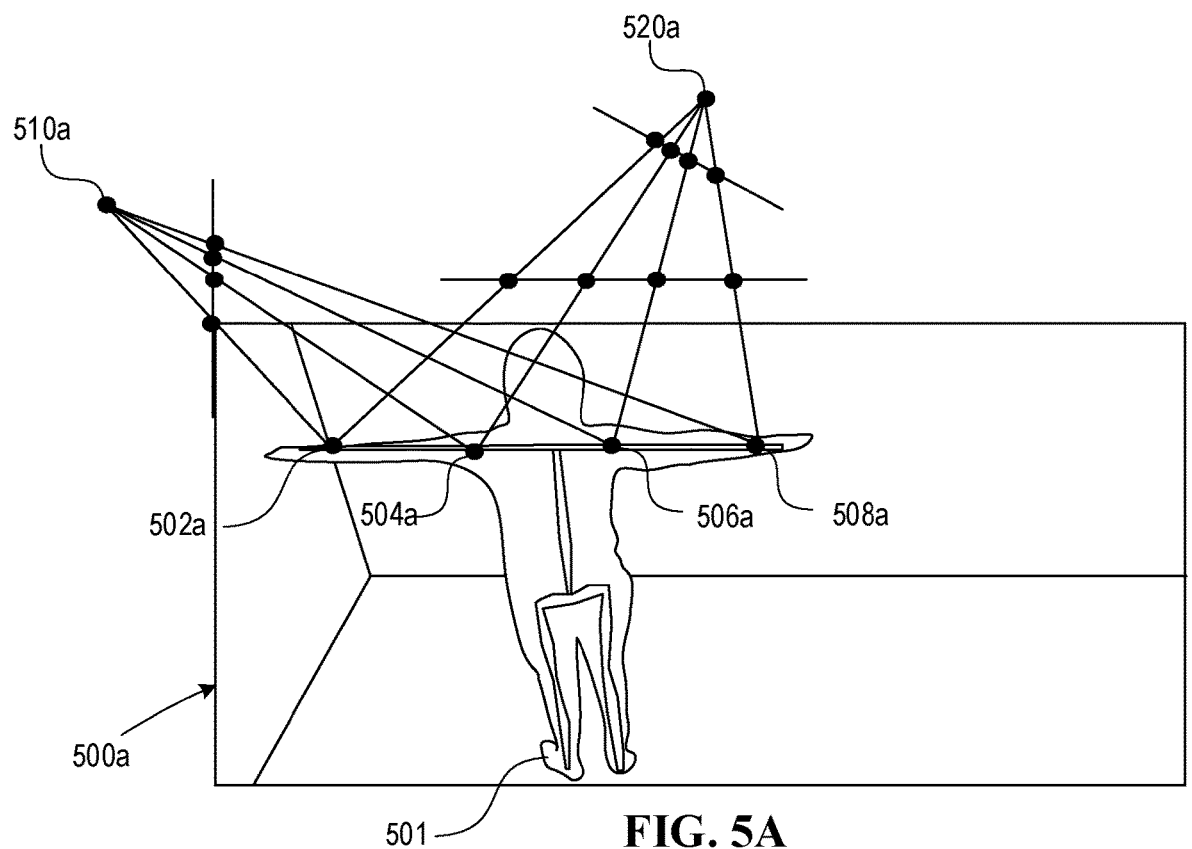
FIG. 5A is an example image of a human in a T-pose at an angle generally parallel to an image place of the camera with an example digital skeleton overlay generated by the example multicamera calibration controller of FIGS. 1A, 1B, and/or 2.

FIG. 5A is an example image 500a of a human subject 501 standing in a T-pose at an angle generally parallel to an image plane of the camera capturing the image with a digital skeleton overlay generated by the example multicamera calibration controller 110 of FIG. 2. In the illustrated example, the example multicamera calibration controller 110 identifies a first anatomical point with image coordinate vector P1 corresponding to a first wrist 502a of the example human 501, a second anatomical point with image coordinate vector P2 corresponding to a first shoulder 504a of the example human 501, a third anatomical point with image coordinate vector P3 corresponding to a second shoulder 506a of the example human 501, and a fourth anatomical point with image coordinate vector P4 corresponding to a second wrist 508a of the example human 501. As shown in the illustrated example, the four points 502a, 504a, 506a, 508a, form a line. As such, the cross-ratio of the four points from the perspective of a first point 510a (associated with a first projection) will be the same as the cross-ratio of the four points from the perspective of a second point 520a (associated with a second projection). Furthermore, the cross-ratio of the four points will be the same from another other point in space surrounding the human subject. These different perspectives or points of projection may correspond to the different positions of the cameras surrounding the human subject including, for example, the point associated with the camera that captured the image 500a shown in FIG. 5A.

Figure 5B:
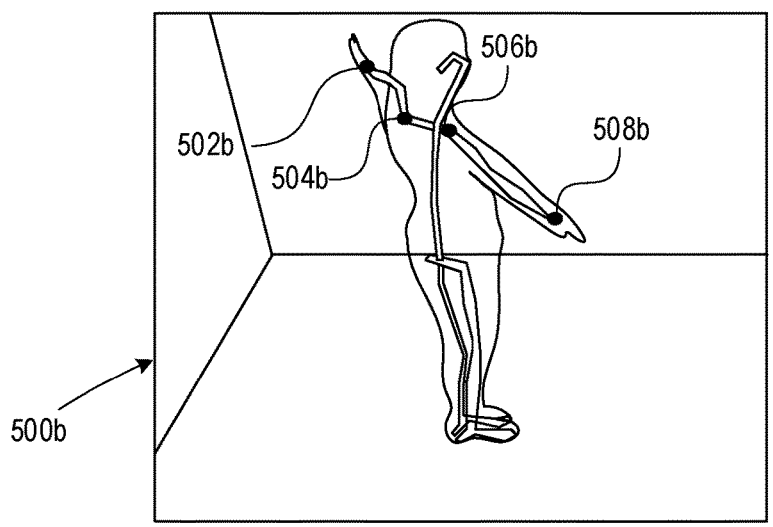
FIG. 5B is an example image of a human in a T-pose at an angle generally perpendicular to the image plane of the camera with an example digital skeleton generated by the example multicamera calibration controller of FIGS. 1A, 1B, and/or 2.

Thus, in some examples, the example pose detector 206 determines whether the human subject is in the particular position corresponding to the T-pose by calculating a cross-ratio of the four points 502a, 504a, 506a, 508a as represented in an image captured by each camera and determining whether the cross-ratio calculated for the images match. If the cross-ratio values do not match (e.g., are not the same), then the projective invariant property has not been satisfied indicating the four points 502a, 504a, 506a, 508a are not in a straight line. Therefore, the example pose detector 206 determines the human is not in the intended pose (e.g., the T-pose in the illustrated example). For example, FIG. 5B is another example image 500b of the same human subject 501. However, at the point in time represented in the image 500b of FIG. 5B, the human subject 501 has rotated approximately 90 degrees such that the T-pose of the human subject is at an angle generally perpendicular to the image plane of the camera. In the example image of FIG. 5B, the four anatomical points P1 (first wrist 502b), P2 (first shoulder 504b), P3 (second shoulder 506b), P4 (second wrist 508b) are not in a straight line, and thus, the example pose detector 206 determines the human subject 501 is not in the intended pose (e.g., a T-pose with the arms extending straight to the left and right). However, if the cross-ratio values between different images do match, the example pose detector 206 determines that the human is in the intended pose corresponding to the four points 502a, 504a, 506a, 508a being in the projective invariant arrangement of a straight line.

In some examples, the example pose detector 206 determines that the human is in the intended pose despite differences between the cross-ratio value calculated for different images associated with different cameras so long as the differences satisfy (e.g., are less than) a threshold to account for situations where the four points 502a, 504a, 506a, 508a are not exactly straight but the deviations are negligible. That is, in some examples, the four points 502a, 504a, 506a, 508a are considered to be in a straight line when they are each within a tolerance threshold of a straight line.

Rather than comparing the cross-ratio values for different images with each other, in some examples, the pose detector 206 compares the cross-ratio value for a particular image to a fixed value stored in the example memory 210. In some examples, the fixed value is defined based on the anatomical dimensions between the four points 502a, 504a, 506a, 508a. That is, in some examples, a cross-ratio value for the four points 502a, 504a, 506a, 508a may be calculated based on real-world measurements of the human subject 501 and defined as the fixed value. Thereafter, the example pose detector 206 may compare cross-ratio values calculated based on the four points 502a, 504a, 506a, 508a as represented in images captured by one or more cameras. If a difference between the image-based cross-ratio value is less than a threshold, the example pose detector 206 determines that the human subject is in the intended pose.

In some examples, the fixed value is a baseline cross-ratio defined based on the anatomical dimensions between the four points 502a, 504a, 506a, 508a. In some examples, the example multicamera calibration controller 110 of FIG. 2 calculates a baseline cross-ratio of a control subject and stores the baseline cross-ratio in the example local memory 210. In some examples, the example pose detector 206 fetches the baseline cross-ratio from the example memory 210 and compares the baseline cross-ratio to a cross-ratio calculated for a human subject in an image captured by a corresponding camera. In some examples, the example pose detector 206 detects a particular pose (e.g., a T-pose) based on the comparison between the baseline cross-ratio and the cross-ratio calculated for a human subject. More particularly, the example pose detector 206 may determine that a human subject is in the particular pose when the calculated cross-ratio matches the baselines cross-ratio. In some examples, the example pose detector 206 determines that the human is in the intended pose despite differences between the baseline cross-ratio and the cross-ratio value calculated for the image associated with a corresponding camera so long as the differences satisfy (e.g., are less than) a threshold to account for situations where the human subject (e.g., the human subject 501 of FIG. 5A), has anatomical dimensions that differ from the anatomical measurements of the control subject used to calculate the baseline cross-ratio.

An example cross-ratio of four one-dimensional points $A(x)$, $B(x)$, $C(x)$, and $D(x)$ along a line may be calculated according to the following equation:

$$\text{Cross}(A, B, C, D) = \frac{|AB|}{|AD|} \div \frac{|CB|}{|CD|} = \frac{a-b}{a-d} \div \frac{c-b}{c-d} \quad (1)$$

where the line $$|AB| = \det \begin{bmatrix} X_{A1} & X_{B1} \\ X_{A2} & X_{B2} \end{bmatrix},$$

the line $$|AD| = \det \begin{bmatrix} X_{A1} & X_{D1} \\ X_{A2} & X_{D2} \end{bmatrix},$$

the line $$|CB| = \det \begin{bmatrix} X_{C1} & X_{B1} \\ X_{C2} & X_{B2} \end{bmatrix},$$

and the line the line $$|CD| = \det \begin{bmatrix} X_{C1} & X_{D1} \\ X_{C2} & X_{D2} \end{bmatrix}.$$

In some examples, the example pose detector 206 receives four, three-dimensional image coordinates P1 $(x_1, y_1, z_1)$, P2 $(x_2, y_2, z_2)$, P3 $(x_3, y_3, z_3)$ and P4 $(x_4, y_4, z_4)$ corresponding to anatomical points of a human subject and computes the cross-ratio of the image coordinate vectors corresponding to the four anatomical points P1, P2, P3, and P4 according to the following equation:

$$\frac{\|P_3 - P_1\|}{\|P_3 - P_2\|} \frac{\|P_4 - P_2\|}{\|P_4 - P_1\|} \text{ where } P_i = \begin{bmatrix} X_i \\ Y_i \\ Z_i \\ 1 \end{bmatrix} \quad (2)$$

In some examples, the coordinate vectors of the anatomical points P1, P2, P3, and P4 correspond to a first wrist of a human subject (e.g., the first wrist 502a of the example human 501 illustrated in FIG. 5), a first shoulder of the example human subject (e.g., first shoulder 504a of human subject 500a), a second shoulder of the human subject (e.g., second shoulder 506a of human subject 500a), and a second wrist of the human subject (e.g., second wrist 508a of human subject 500a), respectively. In some examples, in response to receiving the coordinate vectors corresponding to anatomical points P1, P2, P3, P4, the example pose detector 206 generates a 3×4 vector matrix $$P_4 = \begin{bmatrix} X_4 \\ Y_4 \\ Z_4 \end{bmatrix}$$

based on the coordinate vectors of the four anatomical point vectors. In some examples, the example pose detector 206 generates a 4×4 vector matrix $$P_4 = \begin{bmatrix} X_4 \\ Y_4 \\ Z_4 \\ W_i \end{bmatrix}$$

based on the example 3×4 matrix $P_4$ for purposes of simplifying the cross-ratio calculation. In some examples, the example pose detector 206 assigns a value of 1 to each element in the fourth row $W_i$ of the 4×4 matrix $P_4$ to generate the 4×4 matrix illustrated below:

$$P_4 = \begin{bmatrix} x_1 & x_2 & x_3 & x_4 \\ y_l & y_2 & y_3 & y_4 \\ z_1 & z_2 & z_3 & z_4 \\ 1 & 1 & 1 & 1 \end{bmatrix}$$

In some examples, in response to generating the 4×4 matrix $P_4$, the example pose detector 206 computes the cross-ratio of the coordinate vectors corresponding to P1, P2, P3, and P4 based on equation (2) set forth above. In some examples, in response to determining that the computed cross-ratios of the image captured by a corresponding camera matches a baseline cross-ratio (within some threshold), the example pose detector 206 generates a first signal (e.g., a pose event signal), and sends the first signal to the example transformation calculator 208 of the example multicamera calibration controller 110 illustrated in FIG. 2.

In some examples, in response to determining that the computed cross-ratio of the image captured by a corresponding camera does not match the baseline cross-ratio, the example pose detector 206 generates a second signal (e.g., a no-pose event signal). In some examples, the example pose detector sends the first signal or second signal to the example transformation calculator 208 and/or the example memory 210.

The example multicamera calibration controller 110 illustrated in FIG. 2 includes an example transformation calculator 208 to calculate transformation parameters (e.g., translation parameters and rotation parameters) of one or more corresponding cameras relative to the human subject represented in the images captured by the one or more corresponding cameras. That is, the human subject serves as a calibration pattern (when confirmed to be in a particular position (e.g., a T-pose)) to determine the transformations of each camera relative to the human subject. Once the transformations between the cameras and the human subject are calculated, the example transformation calculator 208 calculates transformation parameters any two of the cameras.

Figure 6:
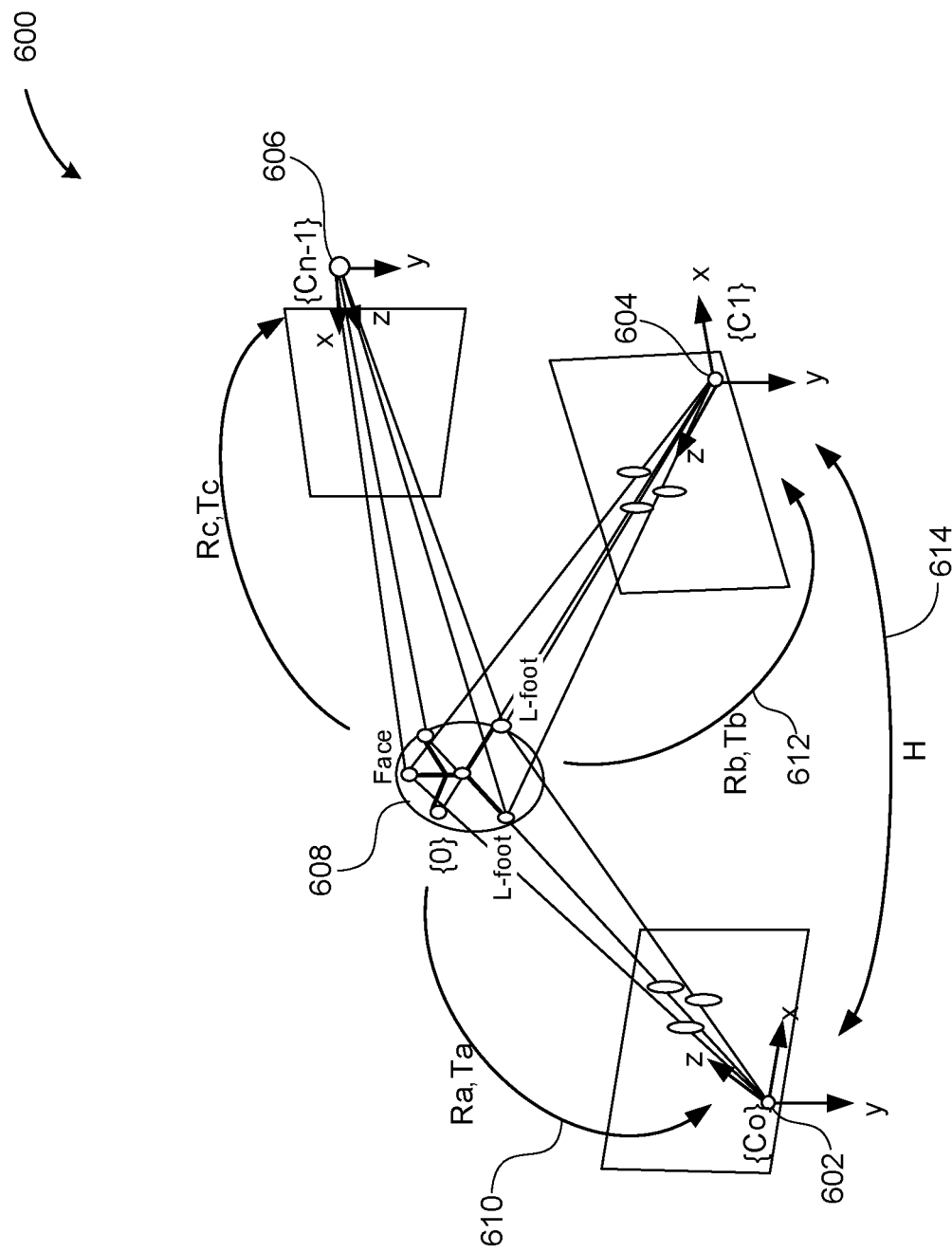
FIG. 6 is an example diagram of an example multicamera viewing system illustrating the transformations calculated by the example multicamera calibration controller of FIGS. 1A, 1B, and/or 2.

FIG. 6 is an example diagram of an example multicamera viewing system 600 illustrating the transformations calculated by the example multicamera calibration controller 110 of FIG. 2. In some examples, the example transformation calculator 208 identifies at least three image coordinates and/or coordinate vectors corresponding to anatomical points and/or anatomical connections of a human subject 608 that form a triangle to be used as a reference from which a solution to a P3P problem may be calculated to define transformation parameters for the corresponding camera in which the anatomical points of the human subject arranged in the triangle are represented. In some examples, the example transformation calculator 208 identifies at least four image coordinates and/or coordinate vectors corresponding to anatomical points and/or anatomical connections of a human subject 608. In some examples, the four points include three points that define a triangle and one other points that may be at any suitable location with a known spatial relationship to the first three points. In some examples, the fourth point is offset relative to the other three points so that the four points collectively define a quadrilateral shape. In other examples, the fourth point is positioned along a line between two of the other points such that the four points include three points arranged in a straight line (e.g., the straight line detected by the pose detector 206) and one point offset from the straight line. Stated differently, in some examples, the four points define a triangle with one point positioned along an edge of the triangle between two of its three vertices defined by the other three points. In some such examples, the fourth point (that does not define a vertex of the triangle) is positioned along a first straight line between first and second points (defining two vertices of the tringle) at a location corresponding to the intersection of the first straight line with a second straight line that is perpendicular to the first straight line and passes through the offset set point (defining the third vertex of the triangle). In other words, in some examples, the four points form a T-shape or an L-shape. In some examples, the example transformation calculator 208 does not identify the coordinates for the four points in the P4P problem until a signal (e.g., a pose event signal) is received from the pose detector 206 indicating the human subject is in a particular pose associated with four anatomical points positioned in a projective invariant arrangement (e.g., arranged in a straight line). In some examples, the example transformation calculator 208 uses three of the anatomical points in the projective invariant arrangement (e.g., the straight line) detected by the example pose detector 206 as three of the points used to define the P4P problem. In some examples, the example transformation calculator uses two of the anatomical points in the projective invariant arrangement (e.g., the straight line) detected by the example pose detector 206 as two of the points in the T-pose, a third point located between the two points (e.g., the anatomical point 408 of the human subject 400 as illustrated in FIG. 4A), and a fourth point corresponding to any other anatomical point on the body of the human subject that is not on the straight line associated with the other three points and that has a known spatial relationship relative to the other three points (e.g., based on the substantially fixed proportions of the human body). For instance, in some examples, the example transformation calculator 208 identifies the anatomical point 408 located by the abdomen or pelvis of the human subject 400 as illustrated in FIG. 4A as the fourth point in the triangle that also defines T-shape. Once the transformation calculator 208 identifies the four sets of coordinates corresponding to four points 402, 404, 406, 408 of a triangle and/or T-shape, the example transformation calculator 208 calculates transformation parameters (e.g., translation parameters and rotation parameters) of the corresponding camera with respect to the human subject by finding the solution to a P4P problem based on the four sets of coordinates. The example transformation calculator may solve the P4P problem using any suitable solver and/or any suitable analytical technique presently known or subsequently developed to solve such a problem.

Determining a solution to the P3P problem and/or the P4P problem is possible because the triangle and/or T-shape defined by the three or four points identified by example transformation is a fixed shape based on the particular proportions of human anatomy between the length of a human's arms relative to the height of a human/s torso (or other proportions of the human body if different anatomical points are selected). In some examples, there may be one solution to a given P4P problem. In some examples, there may be multiple solutions to a given P3P problem. Accordingly, in some examples, points for multiple different triangles to define different P3P problems may be identified and analyzed to converge upon a single solution. In some examples, each of the different triangles used to solve a corresponding P3P problem use the same two points associated with the anatomical points arranged in a straight line as detected by the pose detector 206, while the third point changes. For instance, the third point in a first triangle may correspond to the abdomen or pelvis of the human subject while the third point in a second triangle corresponds to a knee of the human subject, and the third point in a third triangle corresponds to the nose of the human subject.

In some examples, the calculated transformation is one or more 4×4 matrices. In some examples, the example transformation calculator 208 computes a kinematic frame (e.g., Darboux frame) corresponding to each respective camera 602, 604, 606 based on the solution to a P3P and/or P4P problem. In some examples, the calculated transformation parameters define the position and orientation of each camera relative to the human subject 608. More particularly, in some examples, the transformation parameters include translation parameters defining the position (e.g., distance) of each camera 602, 604, 606 in the X, Y, and Z directions relative to the human subject 608. Further, the calculated transformation parameters include rotation parameters defining the angle of rotation of each camera 602, 604, 606 about the X, Y, and Z axes relative to the human subject 608. In some examples, the example transformation calculator 208 provides the calculated translation parameters and/or the calculated rotation parameters to the example memory 210 and/or the example data interface 202 for transmission to an external device (e.g., a user display).

Once the example transformation calculator has determined the transformation parameters between each of the cameras 602, 604, 606 and the human subject 608, it is possible to calculate any transformation between different pairs of the cameras 602, 604, 606. Thus, in some examples, in response to calculating a first transformation 610 (FIG. 6) of a first camera 602 (relative to the human subject 608) and a second transformation 612 of a second camera 604 (relative to the human subject 608), the example transformation calculator 208 illustrated in FIG. 2 calculates a third transformation 614 between the first camera 602 and the second camera 604. In some examples, the example third transformation 614 includes defines the translation of the first camera 602 relative to the second camera 604 and/or the rotation of the first camera 602 relative to the second camera 604. In some examples, the example calculated translation parameters correspond to a position of the first camera 602 (e.g., a distance, relative to the second camera 604). In some examples, the example calculated rotation parameters correspond to an orientation of the first camera 602 (e.g., an angle of rotation), relative to the second camera 604. In some examples, the example, transformation calculator 208 provides the transformation parameters (e.g., translation and rotation) of the first camera 602 relative to the second camera 604 to the example memory 210 for storage and/or the example data interface 202 for sending to one or more external devices (e.g., mobile phones, user displays, and/or image processing equipment).

In some examples, the example multicamera calibration system 110 of FIG. 2 recalibrates the cameras 602, 604, 606 each time the cameras 602, 604, 606 are moved out of position. In some examples, the example multicamera calibration system 110 automatically detects movement in a camera 602, 604, 606 and initiates recalibration in response to detecting the movement. In some examples, the multicamera calibration system 110 automatically recalibrates the cameras 602, 604, 606 in response to detecting one of the cameras 602, 604, 606 has been moved. In some examples, the example multicamera calibration system 110 periodically initiates and executes recalibration. In some examples, the example multicamera calibration system 110 calculates the calibration parameters (e.g., transformations) for the cameras in the system on an ongoing basis (e.g., in substantially real time) regardless of whether any of the cameras have moved or not.

While an example manner of implementing the multicamera calibration controller 110 of FIGS. 1A and/or 1B is illustrated in FIG. 2 one or more of the elements, processes and/or devices illustrated in FIG. 2 may be combined, divided, re-arranged, omitted, eliminated and/or implemented in any other way. Further, the example data interface 202, the example object identifier 204, the example pose detector 206, the example transformation calculator 208, the example memory 210, the example machine learning controller 212, the example model trainer 214, the example model executor 216, and more generally, the example multicamera calibration controller 110 of FIGS. 1A and/or 1B may be implemented by hardware, software, firmware and/or any combination of hardware, software and/or firmware. Thus, for example, any of the example data interface 202, the example object identifier 204, the example pose detector 206, the example transformation calculator 208, the example memory 210, the example machine learning controller 212, the example model trainer 214, the example model executor 216 and/or, more generally, the example multicamera calibration controller 110 of FIGS. 1A and/or 1B could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, data interface 202, the example object identifier 204, the example pose detector 206, the example transformation calculator 208, the example memory 210, the example machine learning controller 212, the example model trainer 214, and/or the example model executor 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example multicamera calibration controller 110 of FIGS. 1A and/or 1B may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
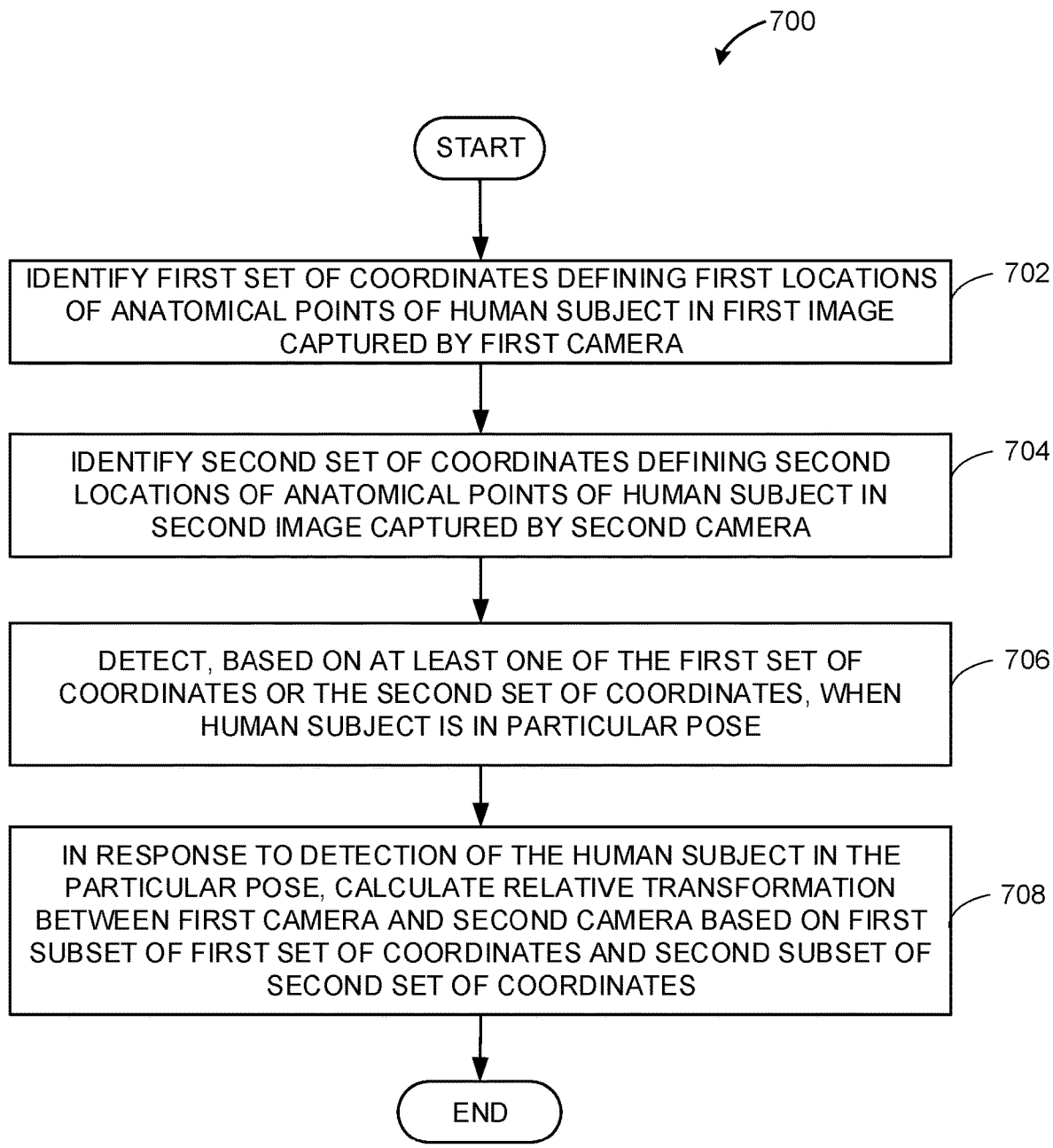
FIG. 7 is a flowchart representative of example machine readable instructions that may be executed to implement the example multicamera calibration controller illustrated in FIGS. 1A, 1B, and/or 2 to calibrate a multicamera system.
Figure 8:
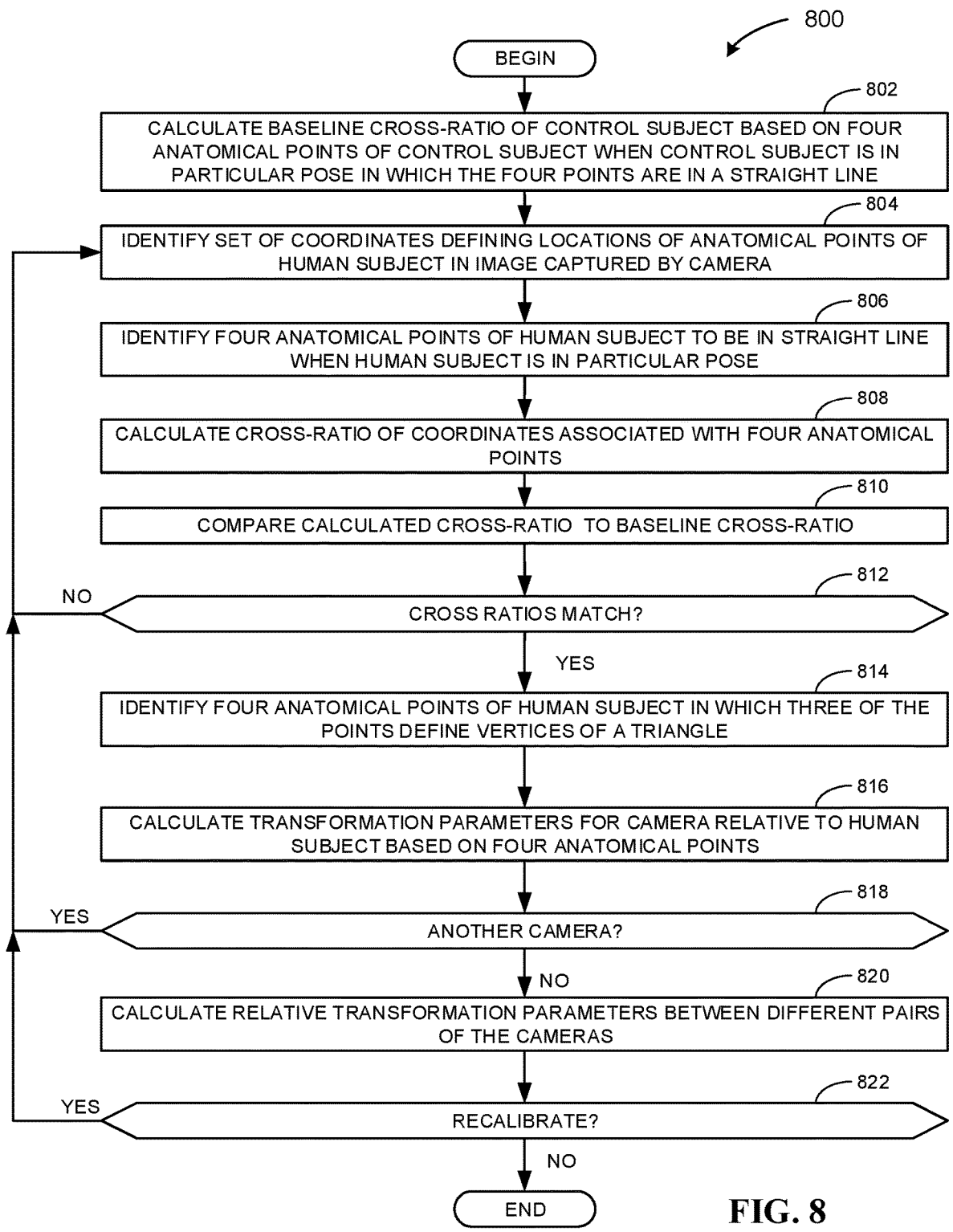
FIG. 8 is another flowchart representative of example machine readable instructions that may be executed to implement the example multicamera calibration controller illustrated in FIGS. 1A, 1B, and/or 2 to calibrate a multicamera system.

A flowchart representative of example hardware logic, machine readable instructions, hardware implemented state machines, and/or any combination thereof for implementing the multicamera calibration controller 110 of FIGS. 1A, 1B, and/or 2 is shown in FIGS. 7-8. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 7-8, many other methods of implementing the multicamera calibration controller 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7-8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions which may be executed to implement the example multicamera calibration controller 110 illustrated in FIGS. 1A, 1B, and/or 2 to calibrate a multicamera system. At block 702, the example object identifier 204 identifies a first set of coordinates defining first locations of anatomical points of a human subject 108 in a first image captured by a first camera (e.g., any one of the cameras 102, 104, 106, 112, 114, 116, 602, 604, 606). For example, the example object identifier 204 may identify anatomical points corresponding to a first hand, a first shoulder, a second shoulder, and a second hand in an image of a human subject 108.

At block 704, the example object detector 204 identifies a second set of coordinates defining second locations of the anatomical points of the human subject 108 in a second image captured by a second camera (e.g., another one of the cameras 102, 104, 106, 112, 114, 116, 602, 604, 606). In some examples, the anatomical points of the human subject 108 identified in the first image are the same as the anatomical points identified in the second image. However, because the two cameras view the human subject from different perspectives, the first and second coordinates will be different.

At block 706, the example pose detector 206 detects, based on at least one of the first set of coordinates or the second set of coordinates, when the human subject 108 is in a particular pose. In some examples, the particular pose corresponds to when particular ones of the anatomical points of the human subject are held in a straight line (e.g., the hands and shoulders when the human subject stands in a T-pose). In some examples, the pose detector 206 detects that human subject is in the particular pose associated with anatomical points being in a straight line by calculating a cross-ratio of the coordinates corresponding to the anatomical points intended to be in the straight line and comparing the resulting value to an expected value.

At block 708, the example transformation calculator 208, in response to detection of the human subject being in the particular pose, calculates a relative transformation between the first camera and the second camera based on a first subset of the first set of coordinates and a second subset of the second set of coordinates. More particular, in some examples, the first and second subsets of the coordinates correspond to anatomical points of the human subject that form a triangle of a fixed shaped based on the anatomical proportions of the human body. In some examples, two points defining vertices of the triangle correspond to two of the anatomical points identified by the pose detector 206 as being in a straight line associated with the particular pose at block 706. Thereafter, the example program of FIG. 7 ends.

FIG. 8 is another flowchart representative of example machine readable instructions which may be executed to implement the example multicamera calibration controller 110 illustrated in FIGS. 1A, 1B, and/or 2 to calibrate a multicamera system.

At block 802, the example multicamera calibration controller 110 calculates a baseline cross-ratio of a control subject based on four anatomical points of the control subject when the control subject is in a particular pose in which the four points are in a straight line (e.g., a T-pose).

At block 804, the example object identifier 204 of the example multicamera calibration controller 110 identifies a set of coordinates defining locations of anatomical points of a human subject in an image captured by a camera. In some examples, the example object identifier 204 identifies the set or coordinates by implementing one or more machine learning models.

At block 806, the example pose detector 206 identifies four anatomical points of the human subject to be in a straight line when the human subject is in a particular pose. As an example, the particular pose may be a T-pose in which the arms of the human subject are extended outward to the left and right and the four anatomical points correspond to each of the hands (or wrists) of the human subject and each of the shoulders of the human subject. In other examples, the four points may correspond to different anatomical points on the human subject. For example, the shoulder points may be replaced by elbow points. Further, while the T-pose has been mentioned throughout this disclosure as a particular example of a particular pose to be detected, other poses that involve four anatomical points that may be arranged in a line may additionally or alternatively be used. For instance, the particular pose may correspond to the human subject extending only one arm out to the side and the four anatomical points correspond to the wrist, elbow and shoulder of the outstretched arm and the other shoulder of the human subject.

At block 808, the example pose detector 206 calculates a cross-ratio of the coordinate associated with the four anatomical points.

At block 810, the example pose detector 206 compares the calculated cross-ratio to the baseline cross-ratio. At block 812, the example pose detector 206 determines whether the cross ratios match. In some examples, the cross-ratios match when a difference between the cross-ratios satisfies (e.g., is less than) a threshold. If the cross-ratios do not match, then the human subject is likely not in the particular pose intended for camera calibration. Accordingly, control returns to block 802 to repeat the process for images captured at a later point in time. If the cross-ratios match, the pose detector 206 confirms that the human subject is in the particular pose intended. As such, control advances to block 814.

At block 814, the example transformation calculator 208 identifies four anatomical points of the human subject in which three of the points define vertices of a triangle. That is, whereas the four anatomical points identified at block 806 are identified to be in a straight line, the four anatomical points identified at block 814 are specifically identified to not be in a line. In some examples, two of the three points in the triangle correspond to two of the four anatomical points identified at block 804. More particular, in some examples, the two anatomical points common to both the set of four points identified at block 814 and the set of four points identified at block 806 correspond to the outer two points on the straight line of four points identified at block 806. While three of the four points identified at block 814 define the vertices of a triangle, the fourth point may be at any suitable location. In some examples, the fourth point is positioned along the straight line associated with the four anatomical points identified at block 806. In some examples, the fourth point is positioned in alignment with the anatomical points that is offset relative to the straight line such that the four points define a T-shape or L-shape. At block 816, the example transformation calculator 208 calculates transformation parameters (e.g., translation and rotation parameters) for the camera relative to the human subject based on the four anatomical points. More particularly, the example transformation calculator 208 uses the four anatomical points that are in a known fixed position (corresponding to the particular pose detected by the cross ratios matching at block 812) as the inputs to a P4P problem. The solution to the P4P problem defines the transformation parameters.

At block 818, the example pose detector 206 determines whether there is another camera to analyze. If so, control returns to block 804 to repeat the process for the other camera. If there are no other cameras to analyze, control advances to block 820.

At block 820, the example transformation calculator 208 calculates relative transformation parameters between different pairs of the cameras. Thereafter, at block 822, the example transformation calculator 208 determines whether to recalibrate the cameras. In some examples, recalibration may be implemented if the cameras have moved and/or if there is a possibility that the cameras might move. If recalibration is to occur, control returns to block 804 to repeat the entire process. Otherwise, the example program of FIG. 8 ends.

Figure 9:
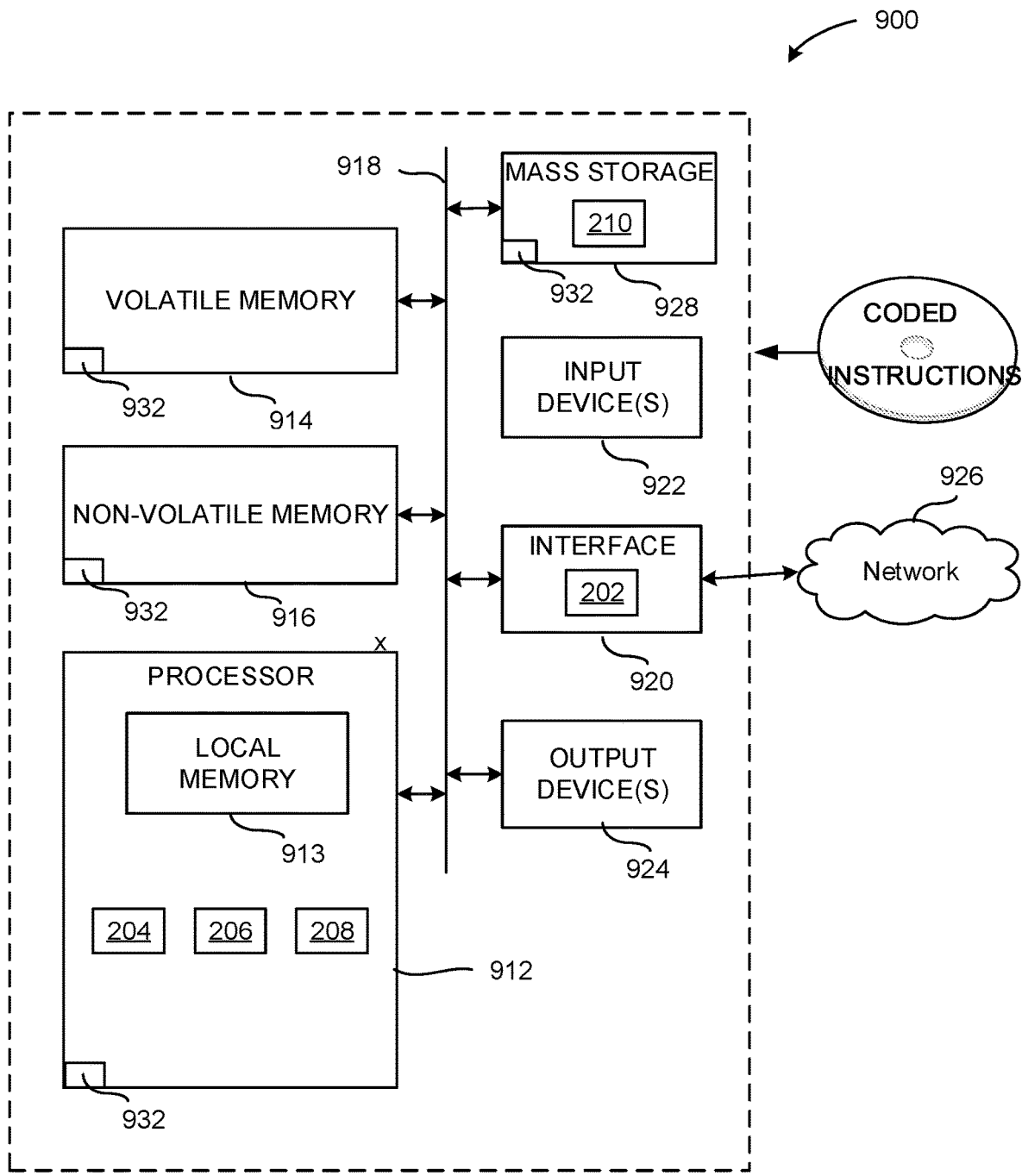
FIG. 9 is a block diagram of an example processing platform structured to execute the example instructions of FIGS. 7-8 to implement the example multicamera calibration controller illustrated of FIGS. 1A, 1B, and/or 2.

FIG. 9 is a block diagram of an example processor platform 900 structured to execute the instructions of FIGS. 7-8 to implement the multicamera calibration controller 110 of FIGS. 1A, 1B, and/or 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example, object identifier 204, the example pose detector 206, and the example transformation calculator 208.

The processor 912 of the illustrated example includes a local memory 913 (e.g., a cache). The processor 912 of the illustrated example is in communication with a main memory including a volatile memory 914 and a non-volatile memory 91 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 7-8 may be stored in the mass storage device 928, in the volatile memory 914, in the non-volatile memory 916, and/or on a removable non-transitory computer readable storage medium such as a CD or DVD.

Figure 10:
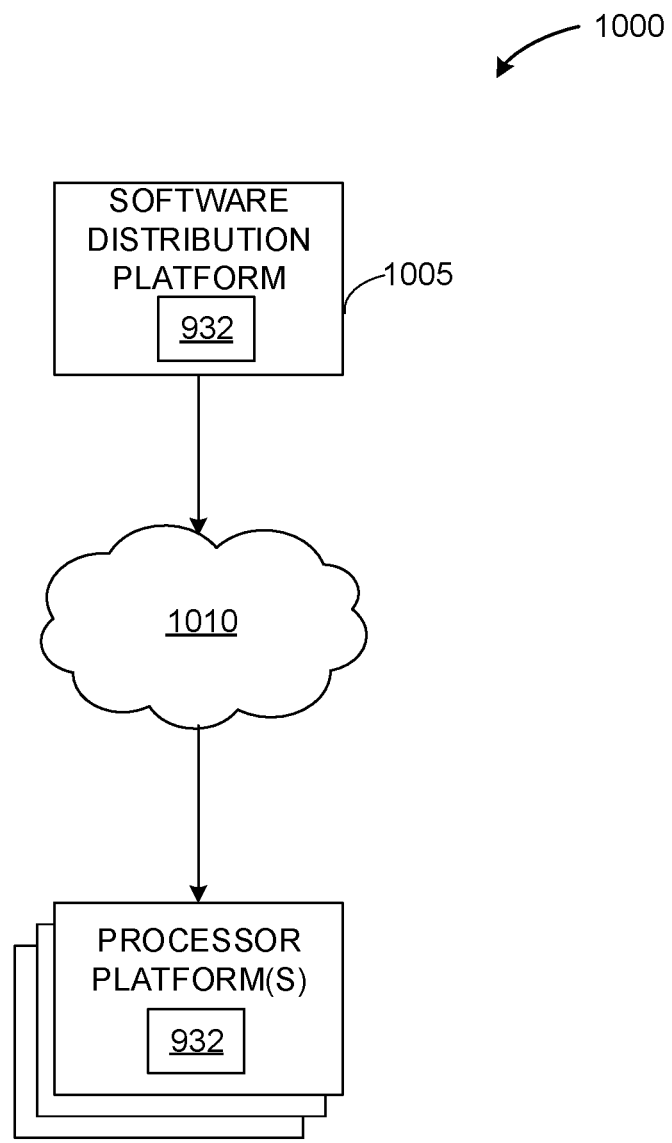
FIG. 10 is a block diagram of an example software distribution platform to distribute software (e.g., software corresponding to the example computer readable instructions of FIGS. 7-8) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1005 to distribute software such as the example computer readable instructions 932 of FIGS. 7-8 to third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 932 of FIG. 10. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the computer readable instructions 932, which may correspond to the example computer readable instructions 932 of FIGS. 7-8, as described above. The one or more servers of the example software distribution platform 1005 are in communication with a network 1010, which may correspond to any one or more of the Internet and/or any of the example networks 926 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 932 from the software distribution platform 1005. For example, the software, which may correspond to the example computer readable instructions 932 of FIGS. 7-8, may be downloaded to the example processor platform 900, which is to execute the computer readable instructions 932 to implement the example multicamera calibration controller 110 of FIGS. 1A, 1B, and/or 2. In some examples, one or more servers of the software distribution platform 1005 periodically offer, transmit, and/or force updates to the software (e.g., the example computer readable instructions 932 of FIGS. 7-8) to ensure improvements, patches, updates, etc. are distributed and applied to the software at the end user devices.

From the foregoing, it will be appreciated that example methods, apparatus and articles of manufacture have been disclosed that enable calibration of a multicamera system based on a pose of a human subject. The disclosed methods, apparatus and articles of manufacture improve the efficiency of using a computing device by at least eliminating the need to know the intrinsic parameters of a camera to determine the extrinsic parameters of the camera. The disclosed methods, apparatus and articles of manufacture are accordingly directed to one or more improvement(s) in the functioning of a computer.

Further examples and combinations thereof include the following:

Example 1 includes an apparatus, comprising an object identifier to identify a first set of coordinates defining first locations of anatomical points of a human in a first image captured by a first camera and identify a second set of coordinates defining second locations of the anatomical points of the human in a second image captured by a second camera, a pose detector to detect, based on at least one of the first set of coordinates or the second set of coordinates, when the human is in a particular pose, and a transformation calculator to, in response to detection of the human in the particular pose, calculate a relative transformation between the first camera and the second camera based on a first subset of the first set of coordinates and a second subset of the second set of coordinates.

Example 2 includes the apparatus of example 1, wherein the particular pose includes a projective invariant arrangement of ones of the locations of the anatomical points of the human.

Example 3 includes the apparatus of example 2, wherein the projective invariant arrangement corresponds to four different ones of the anatomical points being within a tolerance threshold of a straight line.

Example 4 includes the apparatus of example 3, wherein the pose detector is to calculate a first cross-ratio of the four different ones of the anatomical points based on corresponding ones of the first set of coordinates, calculate a second cross-ratio of the four different ones of the anatomical points based on corresponding ones of the second set of coordinates, and determine that the four different ones of the anatomical points are in the projective invariant arrangement of the particular pose of the human when a difference between the first cross-ratio and the second cross-ratio is less than a difference threshold.

Example 5 includes the apparatus of example 3, wherein the pose detector is to calculate a first cross-ratio of the four different ones of the anatomical points based on corresponding ones of the first set of coordinates, and determine that the four different ones of the anatomical points are in the projective invariant arrangement of the particular pose of the human when a difference between the first cross-ratio and a baseline cross ratio is less than a difference threshold.

Example 6 includes the apparatus of example 3, wherein the transformation calculator is to calculate first transformation parameters defining a first translation and a first rotation of the first camera relative to the human, and calculate second transformation parameters defining a second translation and a second rotation of the second camera relative to the human, the relative transformation calculated based on the first transformation parameters and the second transformation parameters.

Example 7 includes the apparatus of example 6, wherein the transformation calculator is to calculate the first transformation parameters based on a triangle defined by three different ones of the anatomical points including a first point, a second point, and a third point, the first and second points corresponding to two of the four different ones of the anatomical points within the tolerance threshold of the straight line, the third point being spaced apart from the straight line.

Example 8 includes the apparatus of example 7, wherein the transformation calculator is to calculate the first transformation parameters based on a fourth point spaced apart from the first, second, and third points.

Example 9 includes the apparatus of example 8, wherein the first, second, third, and fourth points are arranged in at least one of a T-shape or an L-shape.

Example 10 includes the apparatus of example 2, wherein the four different ones of the anatomical points include a first point, a second point, a third point, and a fourth point, the first point proximate a first hand of the human, the second point proximate a first shoulder of the human.

Example 11 includes the apparatus of example 10, wherein the third point is proximate a second hand of the human and the fourth point is proximate a second shoulder of the human.

Example 12 includes the apparatus of example 1, wherein the particular pose includes at least one of a first arm or a second arm of the human extending outward to a side of the human.

Example 13 includes the apparatus of example 1, wherein the first camera is synchronized with the second camera such that the first and second images are captured at substantially the same time.

Example 14 includes the apparatus of example 1, wherein the first set of coordinates are three-dimensional coordinates.

Example 15 includes a non-transitory computer readable medium comprising computer readable instructions that, when executed, cause at least one processor to at least identify a first set of coordinates defining first locations of anatomical points of a human in a first image captured by a first camera and identify a second set of coordinates defining second locations of the anatomical points of the human in a second image captured by a second camera, detect, based on at least one of the first set of coordinates or the second set of coordinates, when the human is in a particular pose, and in response to detection of the human in the particular pose, calculate a relative transformation between the first camera and the second camera based on a first subset of the first set of coordinates and a second subset of the second set of coordinates.

Example 16 includes the non-transitory computer readable medium of example 15, wherein the particular pose includes a projective invariant arrangement of ones of the locations of the anatomical points of the human.

Example 17 includes the non-transitory computer readable medium of example 16, wherein the projective invariant arrangement corresponds to four different ones of the anatomical points being within a tolerance threshold of a straight line.

Example 18 includes the non-transitory computer readable medium of example 17, wherein the computer readable instructions cause the at least one processor to calculate a first cross-ratio of the four different ones of the anatomical points based on corresponding ones of the first set of coordinates, calculate a second cross-ratio of the four different ones of the anatomical points based on corresponding ones of the second set of coordinates, and determine that the four different ones of the anatomical points are in the projective invariant arrangement of the particular pose of the human when a difference between the first cross-ratio and the second cross-ratio is less than a difference threshold.

Example 19 includes the non-transitory computer readable medium of example 17, wherein the computer readable instructions cause the at least one processor to calculate a first cross-ratio of the four different ones of the anatomical points based on corresponding ones of the first set of coordinates, and determine that the four different ones of the anatomical points are in the projective invariant arrangement of the particular pose of the human when a difference between the first cross-ratio and a baseline cross-ratio is less than a difference threshold.

Example 20 includes the non-transitory computer readable medium of example 17, wherein the computer readable instructions cause the at least one processor to at least calculate first transformation parameters defining a first translation and a first rotation of the first camera relative to the human, and calculate second transformation parameters defining a second translation and a second rotation of the second camera relative to the human, the relative transformation calculated based on the first transformation parameters and the second transformation parameters.

Example 21 includes the non-transitory computer readable medium of example 20, wherein the computer readable instructions cause the at least one processor calculate the first transformation parameters based on a triangle defined by three different ones of the anatomical points including a first point, a second point, and a third point, the first and second points corresponding to two of the four different ones of the anatomical points within the tolerance threshold of the straight line, the third point being spaced apart from the straight line.

Example 22 includes the apparatus of example 21, wherein the transformation calculator is to calculate the first transformation parameters based on a fourth point spaced apart from the first, second, and third points.

Example 23 includes the apparatus of example 22, wherein the first, second, third, and fourth points are arranged in at least one of a T-shape or an L-shape.

Example 24 includes the non-transitory computer readable medium of example 16, wherein the four different ones of the anatomical points include a first point, a second point, a third point, and a fourth point, the first point proximate a first hand of the human, the second point proximate a first shoulder of the human.

Example 25 includes the non-transitory computer readable medium of example 24, wherein the third point is proximate a second hand of the human and the fourth point is proximate a second shoulder of the human.

Example 26 includes the non-transitory computer readable medium of example 15, wherein the particular pose includes at least one of a first arm or a second arm of the human extending outward to a side of the human.

Example 27 includes the non-transitory computer readable medium of example 15, wherein the first camera is synchronized with the second camera such that the first and second images are captured at substantially the same time.

Example 28 includes the non-transitory computer readable medium of example 15, wherein the first set of coordinates are three-dimensional coordinates.

Example 29 includes an apparatus, comprising means for identifying a first set of coordinates defining first locations of anatomical points of a human in a first image captured by a first camera and identify a second set of coordinates defining second locations of the anatomical points of the human in a second image captured by a second camera, means for detecting, based on at least one of the first set of coordinates or the second set of coordinates, when the human is in a particular pose, and means for calculating, in response to detection of the human in the particular pose, a relative transformation between the first camera and the second camera based on a first subset of the first set of coordinates and a second subset of the second set of coordinates.

Example 30 includes the apparatus of example 29, wherein the particular pose includes a projective invariant arrangement of ones of the locations of the anatomical points of the human.

Example 31 includes the apparatus of example 30, wherein the projective invariant arrangement corresponds to four different ones of the anatomical points being within a tolerance threshold of a straight line.

Example 32 includes the apparatus of example 31, wherein the detecting means is to calculate a first cross-ratio of the four different ones of the anatomical points based on corresponding ones of the first set of coordinates, calculate a second cross-ratio of the four different ones of the anatomical points based on corresponding ones of the second set of coordinates, and determine that the four different ones of the anatomical points are in the projective invariant arrangement of the particular pose of the human when a difference between the first cross-ratio and the second cross-ratio is less than a difference threshold.

Example 33 includes the apparatus of example 31, further including means for calculating a first cross-ratio of the four different ones of the anatomical points based on corresponding ones of the first set of coordinates, and means for determining that the four different ones of the anatomical points are in the projective invariant arrangement of the particular pose of the human when a difference between the first cross-ratio and a baseline cross-ratio is less than a difference threshold.

Example 34 includes the apparatus of example 31, wherein the calculating means is to calculate first transformation parameters defining a first translation and a first rotation of the first camera relative to the human, and calculate second transformation parameters defining a second translation and a second rotation of the second camera relative to the human, the relative transformation calculated based on the first transformation parameters and the second transformation parameters.

Example 35 includes the apparatus of example 34, wherein the calculating means is to calculate the first transformation parameters based on a triangle defined by three different ones of the anatomical points including a first point, a second point, and a third point, the first and second points corresponding to two of the four different ones of the anatomical points within the tolerance threshold of the straight line, the third point being spaced apart from the straight line.

Example 36 includes the apparatus of example 35, wherein the transformation calculator is to calculate the first transformation parameters based on a fourth point spaced apart from the first, second, and third points.

Example 37 includes the apparatus of example 36, wherein the first, second, third, and fourth points are arranged in at least one of a T-shape or an L-shape.

Example 38 includes the apparatus of example 30, wherein the four different ones of the anatomical points include a first point, a second point, a third point, and a fourth point, the first point proximate a first hand of the human, the second point proximate a first shoulder of the human.

Example 39 includes the apparatus of example 38, wherein the third point is proximate a second hand of the human and the fourth point is proximate a second shoulder of the human.

Example 40 includes the apparatus of example 29, wherein the particular pose includes at least one of a first arm or a second arm of the human extending outward to a side of the human.

Example 41 includes the apparatus of example 29, wherein the first camera is synchronized with the second camera such that the first and second images are captured at substantially the same time.

Example 42 includes the apparatus of example 29, wherein the first set of coordinates are three-dimensional coordinates.

Example 43 includes a method, comprising identifying a first set of coordinates defining first locations of anatomical points of a human in a first image captured by a first camera and identify a second set of coordinates defining second locations of the anatomical points of the human in a second image captured by a second camera, detecting, by executing an instruction with a processor, based on at least one of the first set of coordinates or the second set of coordinates, when the human is in a particular pose, and in response to detection of the human in the particular pose, calculating a relative transformation between the first camera and the second camera based on a first subset of the first set of coordinates and a second subset of the second set of coordinates.

Example 44 includes the method of example 43, wherein the particular pose includes a projective invariant arrangement of ones of the locations of the anatomical points of the human.

Example 45 includes the method of example 44, wherein the projective invariant arrangement corresponds to four different ones of the anatomical points being within a tolerance threshold of a straight line.

Example 46 includes the method of example 45, further including calculating a first cross-ratio of the four different ones of the anatomical points based on corresponding ones of the first set of coordinates, calculating a second cross-ratio of the four different ones of the anatomical points based on corresponding ones of the second set of coordinates, and determining that the four different ones of the anatomical points are in the projective invariant arrangement of the particular pose of the human when a difference between the first cross-ratio and the second cross-ratio is less than a difference threshold.

Example 47 includes the method of example 45, further including calculating first a cross-ratio of the four different ones of the anatomical points based on corresponding ones of the first set of coordinates, and determining that the four different ones of the anatomical points are in the projective invariant arrangement of the particular pose of the human when a difference between the first cross-ratio and a baseline cross-ratio is less than a difference threshold.

Example 48 includes the method of example 45, further including calculating first transformation parameters defining a first translation and a first rotation of the first camera relative to the human, and calculating second transformation parameters defining a second translation and a second rotation of the second camera relative to the human, the relative transformation calculated based on the first transformation parameters and the second transformation parameters.

Example 49 includes the method of example 48, further including calculating the first transformation parameters based on a triangle defined by three different ones of the anatomical points including a first point, a second point, and a third point, the first and second points corresponding to two of the four different ones of the anatomical points within the tolerance threshold of the straight line, the third point being spaced apart from the straight line.

Example 50 includes the method of example 49, wherein the transformation calculator is to calculate the first transformation parameters based on a fourth point spaced apart from the first, second, and third points.

Example 51 includes the method of example 50, wherein the first, second, third, and fourth points are arranged in at least one of a T-shape or an L-shape.

Example 52 includes the method of example 44, wherein the four different ones of the anatomical points include a first point, a second point, a third point, and a fourth point, the first point proximate a first hand of the human, the second point proximate a first shoulder of the human.

Example 53 includes the method of example 52, wherein the third point is proximate a second hand of the human and the fourth point is proximate a second shoulder of the human.

Example 54 includes the method of example 43, wherein the particular pose includes at least one of a first arm or a second arm of the human extending outward to a side of the human.

Example 55 includes the method of example 43, wherein the first camera is synchronized with the second camera such that the first and second images are captured at substantially the same time.

Example 56 includes the method of example 43, wherein the first set of coordinates are three-dimensional coordinates.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
   memory;
   instructions;
   processor circuitry to be programmed by the instructions to:
   identify a first set of coordinates defining locations of anatomical points of a human in a first image captured by a first camera and identify a second set of coordinates defining the locations of the anatomical points of the human in a second image captured by a second camera;
   detect when the human is in a particular pose based on at least one of the first set of coordinates or the second set of coordinates, the particular pose including a projective invariant arrangement of ones of the locations of the anatomical points of the human; and
   calculate, in response to detection of the human in the particular pose, a relative transformation between the first camera and the second camera based on a first subset of the first set of coordinates and a second subset of the second set of coordinates.

2. The apparatus of claim 1, wherein the projective invariant arrangement corresponds to four different ones of the anatomical points being within a tolerance threshold of a straight line.

3. The apparatus of claim 2, wherein the processor circuitry is to:
   calculate a first cross-ratio of the four different ones of the anatomical points based on corresponding ones of the first set of coordinates;
   calculate a second cross-ratio of the four different ones of the anatomical points based on corresponding ones of the second set of coordinates; and
   determine that the four different ones of the anatomical points are in the projective invariant arrangement of the particular pose of the human when a difference between the first cross-ratio and the second cross-ratio is less than a difference threshold.

4. The apparatus of claim 2, wherein the processor circuitry is to:
   calculate a first cross-ratio of the four different ones of the anatomical points based on corresponding ones of the first set of coordinates; and
   determine that the four different ones of the anatomical points are in the projective invariant arrangement of the particular pose of the human when a difference between the first cross-ratio and a baseline cross ratio is less than a difference threshold.

5. The apparatus of claim 2, wherein the processor circuitry is to:
calculate first transformation parameters defining a first translation and a first rotation of the first camera relative to the human; and
calculate second transformation parameters defining a second translation and a second rotation of the second camera relative to the human, the relative transformation calculated based on the first transformation parameters and the second transformation parameters.

6. The apparatus of claim 5, wherein the processor circuitry is to calculate the first transformation parameters based on a triangle defined by three different ones of the anatomical points including a first point, a second point, and a third point, the first and second points corresponding to two of the four different ones of the anatomical points within the tolerance threshold of the straight line, the third point being spaced apart from the straight line.

7. The apparatus of claim 6, wherein the processor circuitry is to calculate the first transformation parameters based on a fourth point spaced apart from the first, second, and third points.

8. The apparatus of claim 7, wherein the first, second, third, and fourth points are arranged in at least one of a T-shape or an L-shape.

9. The apparatus of claim 2, wherein the four different ones of the anatomical points include a first point, a second point, a third point, and a fourth point, the first point proximate a first hand of the human, the second point proximate a first shoulder of the human.

10. The apparatus of claim 9, wherein the third point is proximate a second hand of the human and the fourth point is proximate a second shoulder of the human.

11. The apparatus of claim 1, wherein the particular pose includes at least one of a first arm or a second arm of the human extending outward to a side of the human.

12. The apparatus of claim 1, wherein the first camera is synchronized with the second camera such that the first and second images are captured at substantially a same time.

13. The apparatus of claim 1, wherein the first set of coordinates are three-dimensional coordinates.

14. A non-transitory computer readable medium comprising computer readable instructions to cause at least one processor circuit to at least:
identify a first set of coordinates defining first locations of anatomical points of a human in a first image captured by a first camera and identify a second set of coordinates defining the locations of the anatomical points of the human in a second image captured by a second camera;
detect, based on at least one of the first set of coordinates or the second set of coordinates, when the human is in a particular pose, the particular pose including a projective invariant arrangement of ones of the locations of the anatomical points of the human; and
in response to detection of the human in the particular pose, calculate a relative transformation between the first camera and the second camera based on a first subset of the first set of coordinates and a second subset of the second set of coordinates.

15. The non-transitory computer readable medium of claim 14, wherein the projective invariant arrangement corresponds to four different ones of the anatomical points being within a tolerance threshold of a straight line.

16. The non-transitory computer readable medium of claim 15, wherein the computer readable instructions cause one or more of the at least one processor circuit to:

calculate a first cross-ratio of the four different ones of the anatomical points based on corresponding ones of the first set of coordinates; and
determine that the four different ones of the anatomical points are in the projective invariant arrangement of the particular pose of the human when a difference between the first cross-ratio and a baseline cross-ratio is less than a difference threshold.

17. The non-transitory computer readable medium of claim 15, wherein the computer readable instructions cause one or more of the at least one processor circuit to at least:
calculate first transformation parameters defining a first translation and a first rotation of the first camera relative to the human; and
calculate second transformation parameters defining a second translation and a second rotation of the second camera relative to the human, the relative transformation calculated based on the first transformation parameters and the second transformation parameters.

18. The non-transitory computer readable medium of claim 17, wherein the computer readable instructions cause one or more of the at least one processor circuit to calculate the first transformation parameters based on a triangle defined by three different ones of the anatomical points including a first point, a second point, and a third point, the first and second points corresponding to two of the four different ones of the anatomical points within the tolerance threshold of the straight line, the third point being spaced apart from the straight line.

19. The non-transitory computer readable medium of claim 18, wherein the computer readable instructions cause one or more of the at least one processor circuit to calculate the first transformation parameters based on a fourth point spaced apart from the first, second, and third points.

20. A method, comprising:
identifying a first set of coordinates defining first locations of anatomical points of a human in a first image captured by a first camera and identify a second set of coordinates defining the locations of the anatomical points of the human in a second image captured by a second camera;
detecting, by executing an instruction with a processor, based on at least one of the first set of coordinates or the second set of coordinates, when the human is in a particular pose, the particular pose including a projective invariant arrangement of ones of the locations of the anatomical points of the human; and
in response to detection of the human in the particular pose, calculating a relative transformation between the first camera and the second camera based on a first subset of the first set of coordinates and a second subset of the second set of coordinates.

21. The method of claim 20, wherein the projective invariant arrangement corresponds to four different ones of the anatomical points being within a tolerance threshold of a straight line.

22. The method of claim 21, further including:
calculating a first cross-ratio of the four different ones of the anatomical points based on corresponding ones of the first set of coordinates; and
determining that the four different ones of the anatomical points are in the projective invariant arrangement of the particular pose of the human when a difference between the first cross-ratio and a baseline cross-ratio is less than a difference threshold.

23. The method of claim 21, further including:
calculating a first cross-ratio of the four different ones of the anatomical points based on corresponding ones of the first set of coordinates;
calculating a second cross-ratio of the four different ones of the anatomical points based on corresponding ones of the second set of coordinates; and
determining that the four different ones of the anatomical points are in the projective invariant arrangement of the particular pose of the human when a difference between the first cross-ratio and the second cross-ratio is less than a difference threshold.

24. The non-transitory computer readable medium of claim 15, wherein the computer readable instructions cause one or more of the at least one processor circuit to:
calculate a first cross-ratio of the four different ones of the anatomical points based on corresponding ones of the first set of coordinates;
calculate a second cross-ratio of the four different ones of the anatomical points based on corresponding ones of the second set of coordinates; and
determine that the four different ones of the anatomical points are in the projective invariant arrangement of the particular pose of the human when a difference between the first cross-ratio and the second cross-ratio is less than a difference threshold.

25. The apparatus of claim 1, wherein the first subset of the first set of coordinates and the second subset of the second set of coordinates correspond to the ones of the locations of the anatomical points of the human in the projective invariant arrangement.

* * * * *